US009701838B2

(12) United States Patent
Medoff et al.

(10) Patent No.: US 9,701,838 B2
(45) Date of Patent: Jul. 11, 2017

(54) METHOD AND STRUCTURES FOR PROCESSING MATERIALS

(71) Applicant: Xyleco, Inc., Woburn, MA (US)

(72) Inventors: Marshall Medoff, Brookline, MA (US); Thomas Craig Masterman, Rockport, MA (US)

(73) Assignee: XYLECO, INC., Wakefield, MA (US)

( * ) Notice: Subject to any disclaimer, the term of this patent is extended or adjusted under 35 U.S.C. 154(b) by 178 days.

(21) Appl. No.: 14/664,010

(22) Filed: Mar. 20, 2015

(65) Prior Publication Data

US 2015/0265999 A1    Sep. 24, 2015

Related U.S. Application Data

(60) Provisional application No. 61/968,405, filed on Mar. 21, 2014.

(51) Int. Cl.
| | | |
|---|---|---|
| *B01J 19/12* | (2006.01) | |
| *C08L 97/02* | (2006.01) | |
| *C08H 7/00* | (2011.01) | |
| *C08H 8/00* | (2010.01) | |
| *C08L 97/00* | (2006.01) | |

(52) U.S. Cl.
CPC ............ *C08L 97/02* (2013.01); *C08H 6/00* (2013.01); *C08H 8/00* (2013.01); *C08L 97/005* (2013.01); *Y10T 428/2991* (2015.01)

(58) Field of Classification Search
CPC ......... C08L 97/02; C08L 97/005; C08H 6/00; C08H 8/00; Y10T 428/2991; Y10T 156/10; A61L 2/087; A61L 2202/23; G21K 5/02; H01J 33/04; B01J 3/042; C13K 1/02
See application file for complete search history.

(56) References Cited

U.S. PATENT DOCUMENTS

| | | | |
|---|---|---|---|
| 3,844,890 A | 10/1974 | Horikoshi et al. | |
| 4,368,079 A * | 1/1983 | Rugg ................ | C13K 1/02 127/1 |
| 4,385,239 A * | 5/1983 | Miller ................ | G21K 5/10 250/400 |
| 4,435,307 A | 3/1984 | Barbesgaard et al. | |
| 5,806,284 A | 9/1998 | Gifford | |
| 7,153,533 B2 | 12/2006 | Burke et al. | |

(Continued)

FOREIGN PATENT DOCUMENTS

| | | |
|---|---|---|
| EP | 0458162 A1 | 11/1991 |
| WO | WO-2006102543 A2 | 9/2006 |

(Continued)

OTHER PUBLICATIONS

Chu, "Overview of Light-Ion Beam Therapy," Columbus—Ohio, ICRU-IAEA Meeting, Mar. 18-20, 2006 (pp. 1-20).

(Continued)

*Primary Examiner* — Xiuyu Tai
(74) *Attorney, Agent, or Firm* — Leber IP Law

(57) ABSTRACT

Materials (e.g., plant biomass, animal biomass, and municipal waste biomass) are processed to produce useful intermediates and products, such as energy, fuels, foods or materials. For example, systems equipment, and methods are described that can be used to treat feedstock materials, such as cellulosic and/or lignocellulosic materials, where the feedstock is enclosed in a web.

39 Claims, 11 Drawing Sheets

(56) References Cited

U.S. PATENT DOCUMENTS

| | | |
|---|---|---|
| 7,900,857 B2 | 3/2011 | Medoff |
| 7,931,784 B2 | 4/2011 | Medoff |
| 7,932,065 B2 | 4/2011 | Medoff |
| 7,971,809 B2 | 7/2011 | Medoff |
| 8,074,910 B2 | 12/2011 | Medoff |
| 8,083,906 B2 | 12/2011 | Medoff |
| 8,142,620 B2 | 3/2012 | Medoff |
| 8,318,453 B2 | 11/2012 | Medoff |
| 8,415,122 B2 | 4/2013 | Medoff et al. |
| 8,911,833 B2 | 12/2014 | Medoff |
| 2004/0050020 A1 | 3/2004 | Hanson et al. |
| 2005/0123435 A1 | 6/2005 | Cutler et al. |
| 2007/0180792 A1 | 8/2007 | Sperry et al. |
| 2007/0202220 A1* | 8/2007 | Dicosola ............... A23B 4/00 426/106 |
| 2009/0173039 A1 | 7/2009 | Slomski et al. |
| 2010/0105119 A1 | 4/2010 | Medoff |
| 2010/0124583 A1 | 5/2010 | Medoff |
| 2010/0159569 A1 | 6/2010 | Medoff et al. |
| 2011/0014330 A1 | 1/2011 | Meyers et al. |
| 2011/0111456 A1* | 5/2011 | Medoff ............... B01J 19/085 435/68.1 |
| 2012/0052536 A1 | 3/2012 | Medoff et al. |
| 2012/0100577 A1 | 4/2012 | Medoff et al. |
| 2013/0052682 A1 | 2/2013 | Medoff et al. |
| 2013/0052687 A1 | 2/2013 | Medoff et al. |
| 2014/0011248 A1 | 1/2014 | Medoff et al. |

FOREIGN PATENT DOCUMENTS

| | | |
|---|---|---|
| WO | WO-2008073186 A2 | 6/2008 |
| WO | WO-2010135380 A1 | 11/2010 |
| WO | WO-2013096693 A1 | 6/2013 |
| WO | WO-2013096700 A1 | 6/2013 |
| WO | WO-2013101977 A1 | 7/2013 |
| WO | WO-2014059113 A1 | 4/2014 |
| WO | WO-2014059131 A1 | 4/2014 |
| WO | WO-2014059140 A1 | 4/2014 |
| WO | WO-2014138535 A1 | 9/2014 |
| WO | WO-2014138540 A1 | 9/2014 |
| WO | WO-2014138543 A1 | 9/2014 |
| WO | WO-2014138545 A1 | 9/2014 |
| WO | WO-2014138548 A1 | 9/2014 |
| WO | WO-2014138549 A1 | 9/2014 |
| WO | WO-2014138550 A1 | 9/2014 |
| WO | WO-2014138551 A1 | 9/2014 |
| WO | WO-2014138553 A1 | 9/2014 |
| WO | WO-2014138594 A1 | 9/2014 |
| WO | WO-2014138598 A1 | 9/2014 |
| WO | WO-2014138600 A1 | 9/2014 |

OTHER PUBLICATIONS

International Search Report and Written Opinion issued by the United States Patent and Trademark Office as International Searching Authority for International Application No. PCT/US15/19119 mailed Jun. 3, 2015 (10 pages).

Iwata et al., "Alternating-Phase-Focused IH-DTL for Heavy-Ion Medical Accelerators," Proceedings of EPAC, Edinburgh, Scotland, No Month Listed 2006 (pp. 2328-2330).

Leitner et al., "Status of the Superconducting ECR Ion Source Venus," Proceedings of EPAC, Vienna, Austria, No Month Listed 2000 (pp. 1610-1612).

Philippidis, "Cellulose Bioconversion Technology," Chapter 12, Handbook on Bioethanol: Production and Utilization, Wyman, C.E., ed., Taylor & Francis, Washington, DC, No Month Listed 1996 (35 pages).

Prelec, "Ions and Ion Accelerators for Cancer Treatment," Fizika B, vol. 6, No. 4, No Month Listed 1997 (pp. 177-207).

* cited by examiner

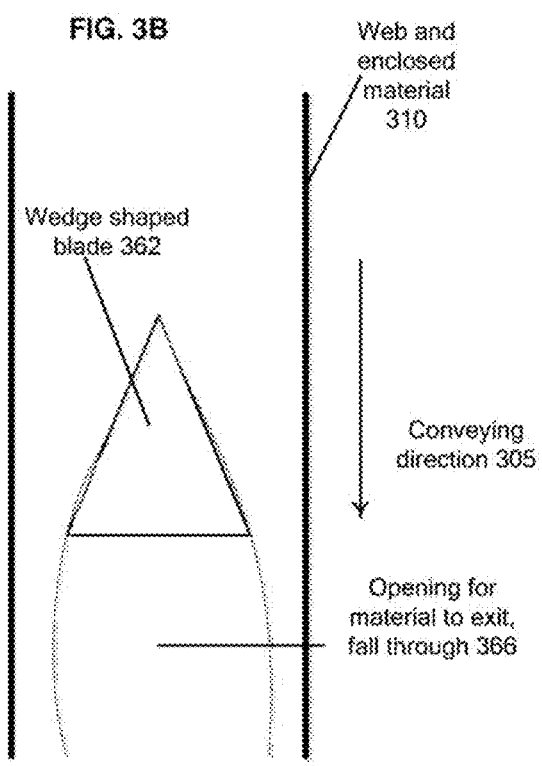

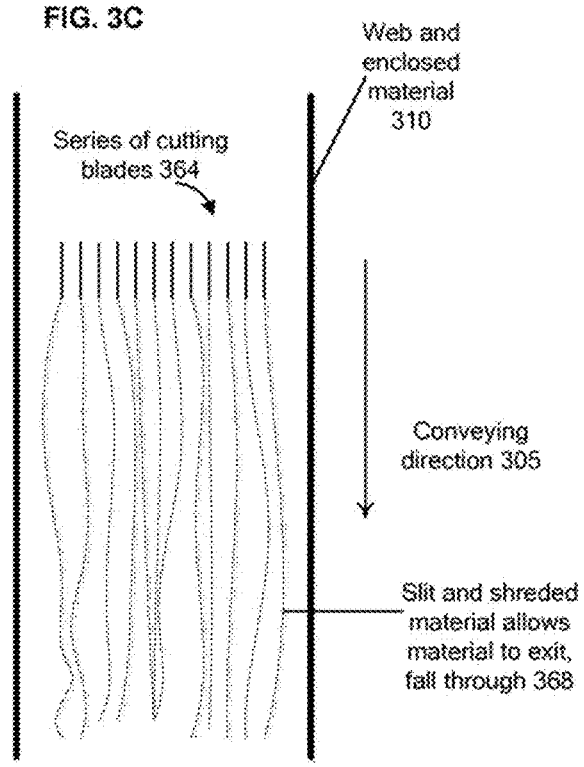

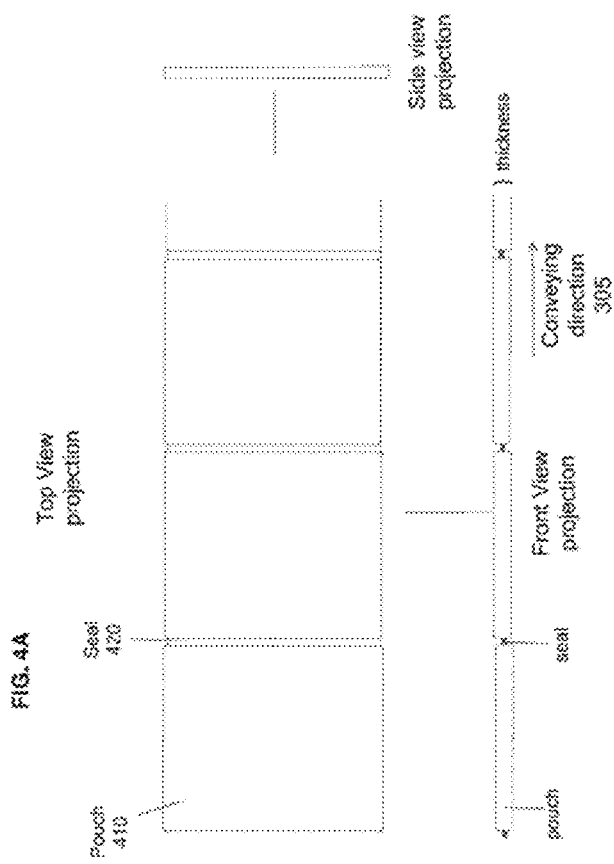

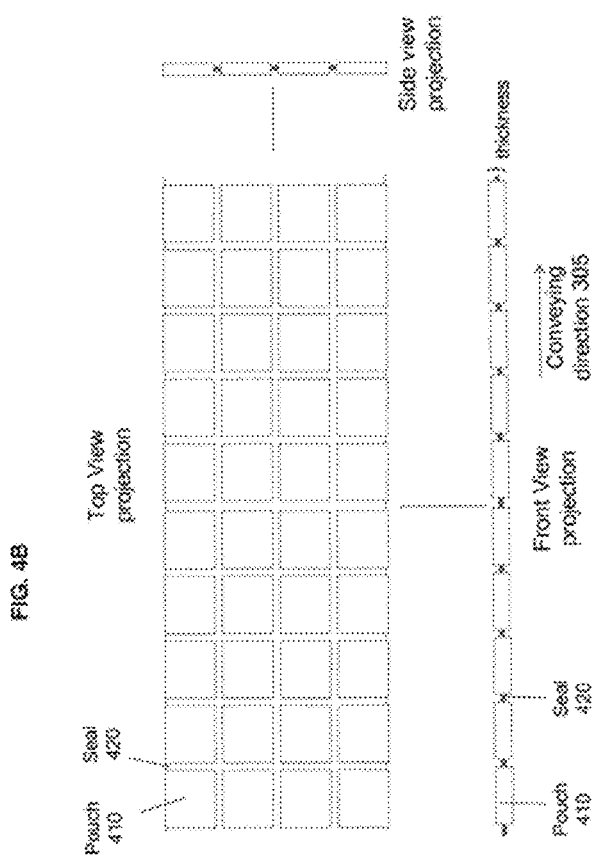

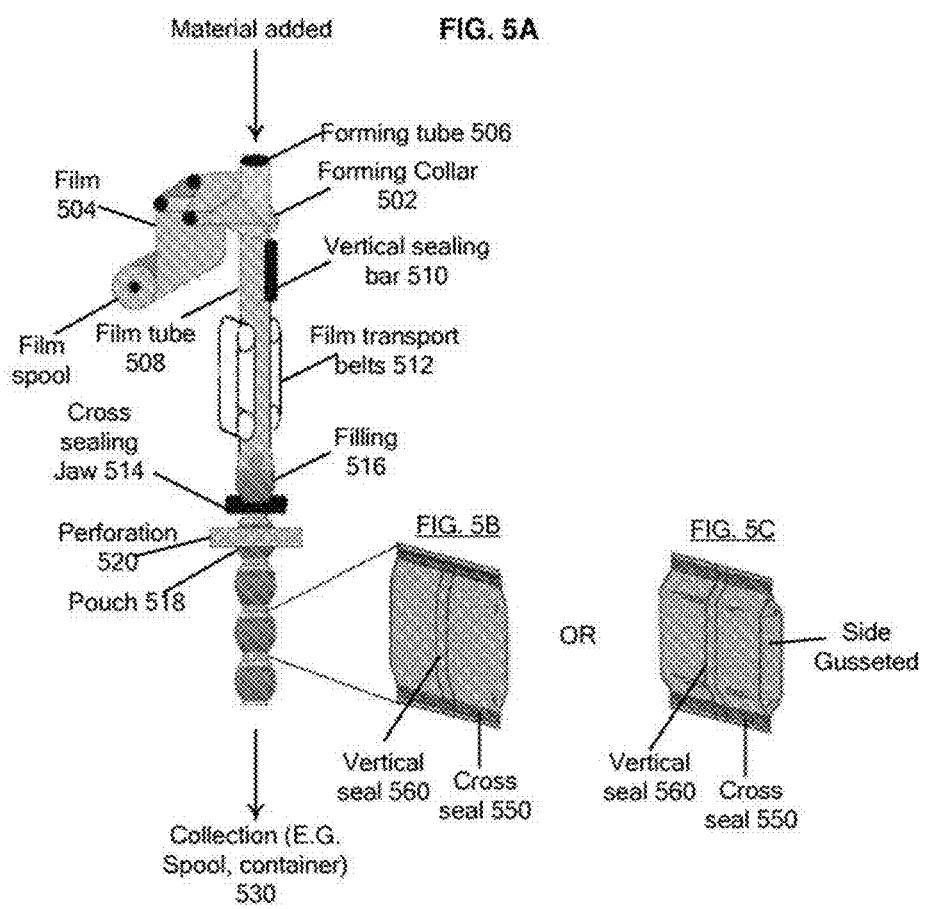

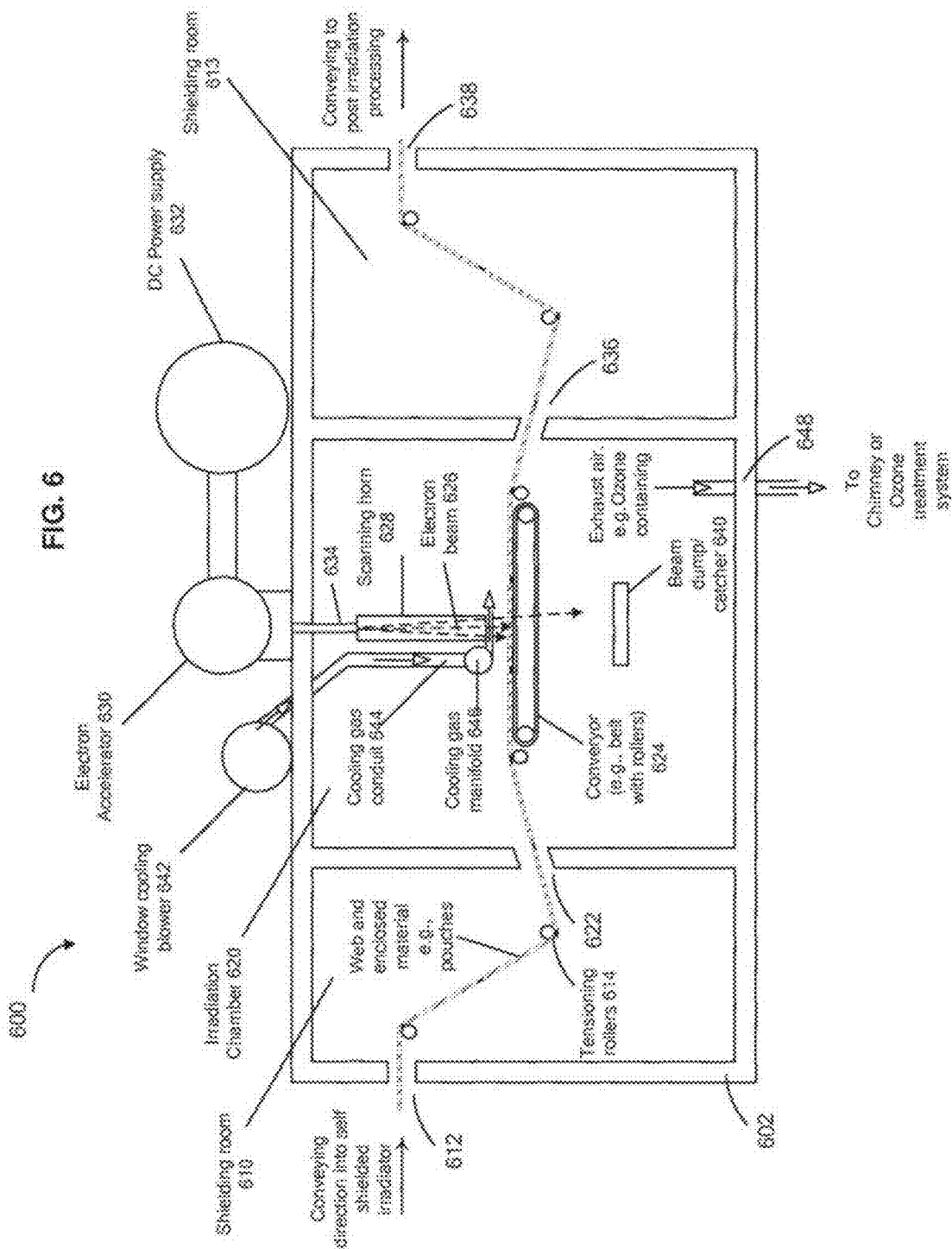

METHOD AND STRUCTURES FOR PROCESSING MATERIALS

CROSS REFERENCE TO RELATED APPLICATIONS

This application claims the benefit of priority under 35 U.S.C. §119(e) to U.S. Provisional Application Ser. No. 61/968,405, filed Mar. 21, 2014, the contents of which are incorporated by reference in its entirety.

BACKGROUND OF THE INVENTION

Many potential lignocellulosic feedstocks are available today, including agricultural residues, woody biomass, municipal waste, oilseeds/cakes and seaweed, to name a few. At present, these materials are often under-utilized, being used, for example, as animal feed, biocompost materials, burned in a co-generation facility or even landfilled.

Lignocellulosic biomass includes crystalline cellulose fibrils embedded in a hemicellulose matrix, surrounded by lignin. This produces a compact matrix that is difficult to access by enzymes and other chemical, biochemical and/or biological processes. Cellulosic biomass materials (e.g., biomass material from which the lignin has been removed) is more accessible to enzymes and other conversion processes, but even so, naturally-occurring cellulosic materials often have low yields (relative to theoretical yields) when contacted with hydrolyzing enzymes. Lignocellulosic biomass is even more recalcitrant to enzyme attack. Furthermore, each type of lignocellulosic biomass has its own specific composition of cellulose, hemicellulose and lignin.

SUMMARY

Generally, the inventions relate to enclosures, e.g., enclosures or structures formed by a web, for treating materials, such as biomass materials and hydrocarbon containing materials. This inventions also relate to equipment, methods and systems for producing products, (e.g., from a biomass material or another feedstock. The methods and systems include utilizing a continuous web for enclosing a material and treating the material with ionizing radiation. Generally, many methods include treating a recalcitrant material (e.g., a biomass), that is enclosed in a structure, with electron beams, to reduce its recalcitrance. The reduced recalcitrance material can then be biochemically and/or chemically processed to products, for example, ethanol, xylitol, hydrocarbons and other useful products.

In one aspect, the invention relates to a method of treating a material including conveying a web carrying a material through an area of ionizing radiation. Optionally the web carries the material in discrete spaced apart sachets or pouches along its longitudinal length. For example, the sachets can be spaced apart along the longitudinal length by between about 0.5 cm and about 50 cm (e.g., between about 1 cm and about 25 cm, between about 2 cm and about 10 cm). The web can optionally carry the material in discrete spaced apart sachets along its lateral length, which is substantially perpendicular to its longitudinal length. For example, the sachets can be spaced apart along a lateral length of from about 0.5 cm and about 50 cm (e.g., from about 1 cm and about 25 cm, from about 2 cm and about 10 cm). The sachets can optionally include an upper and a lower sheet and the material is disposed between the upper and lower sheet. Each upper and lower sheet can have a thickness of from about 1 mil and about 10 mil (e.g., from about 2 mil and about 6 mil). Each upper and lower sheet can include apertures defined therein, wherein each aperture can have a diameter of from about 0.01 mil and about 5 mil (e.g., from about 0.1 mil and about 3 mil, from about 0.5 mil and about 2 mil). In some embodiments the web is formed from a thermoplastic material. For example, the thermoplastic material includes a polyolefin configured to crosslink upon irradiation and/or the thermoplastic material includes a polyolefin configured to not degrade upon irradiation. Optionally the thermoplastic material includes a polyolefin, for example, a polyethylene, such as a polyethylene selected from the group consisting of polyethylene homopolymer, linear low density polyethylene, low density polyethylene and high density polyethylene. Optionally, the ionizing radiation comprises a beam of electrons directed at the web. Optionally, the area of irradiation (e.g., just prior to the irradiation and/or during irradiation) has a portion that includes a vibration, (e.g., configured to evenly spread the material inside sachets or pouches.

In some embodiments, the web is formed to enclose a material (e.g., forming the web carrying material) as the web carrying material is conveyed through the area of ionizing radiation. For example, a system for forming the sachets (e.g., forming, filling and sealing) is integrated with and/or leads directly to (e.g., without a storing stage therebetween) to the area of ionizing radiation. Therefore, for example, in this embodiment the web is formed into sachets or pouches and then the web formed into the sachets or pouches is conveyed through the ionizing area wherein the time between the forming and irradiation of individual sachets or pouches is short (e.g., less than an hour, less than 30 min, less than 20 min, less than 10 min, less than 5 min or even less than a minute).

In alternate embodiments the web is formed to enclose a material, forming the web carrying material, prior to it being conveyed through the ionizing radiation. For example, a system for forming the sachets is not integrated with and/or does not lead directly to the ionizing radiation. For example, in this embodiment the sachets are stored for a time (e.g., at least an hour, at least 6 hours, at least 24 hours, at least 48 hours, at least for a week, or at least for even a month) before being conveyed in the ionizing radiation). The storage can include transporting the web formed into the sachets or pouches, for example, to and/or between sites for different processing.

In some embodiments, the ionizing radiation is contained in a vault. For example, the vault comprises a steel, such as a lead/steel composite. Optionally the vault can be small, for example, defining an irradiation space having a volume of less than about 250 ft$^3$ (e.g., less than about 150 ft$^3$, less than about 125 ft$^3$, less than about 100 ft$^3$, less than about 64 ft$^3$) and/or the vault has an internal length and width of less than about 6 feet (e.g., less than about 5 feet, less than about 4 feet, less than about 3 feet). In some embodiments the vault can be small, for example, wherein the vault has an internal length and width of between about 2 feet and about 7 feet (e.g., between about 2 feet and about 6 feet, between about 3 feet and about 5 feet.

In another aspect, the invention relates to a method of treating a material including conveying a web and an enclosed material through a beam of ionizing radiation. For example, the material can be conveyed on a substantially flat surface in a direction substantially perpendicular to the beam of ionizing radiation. Optionally, the enclosed material is a lignocellulosic or cellulosic material. Optionally, the web includes a synthetic material (e.g., a synthetic polymer). Optionally, the enclosed material receives a dose of radiation between about 10 and 150 Mrad of radiation (e.g., between about 15 and about 50 Mrad). In some embodiments the ionizing radiation is an electron beam radiation. For example, the average energy of the electrons in the electron beam can be between about 0.5 MeV and about 2 MeV. Optionally, the web is in the form of a plurality of sachets or pouches that enclose the material. In some embodiments, the web enclosed material forms a substantially uniform layer of the enclosed material.

In some implementations, the web enclosed material forms a substantially uniform layer of the enclosed material. For example, the layer thickness is less than about 1" thick (e.g., less than about 0.5" thick, between about 0.5" and 0.1" thick). Optionally, the material has an average particle size between about 5 and about 0.1 mm. Optionally, the web includes a plurality of perforations or apertures through the enclosing web. For example, the enclosing web includes a plurality of perforations through the enclosing web and the average size of the perforations is less than the average particle size of the enclosed material. Optionally, the methods further include releasing the material from the enclosing web and saccharifying the material.

In yet another aspect, the invention is a preformed web carrying an irradiated material, wherein the web consists of a series of discrete spaced apart sachets arranged longitudinally, the sachets configured to enclose therein the irradiated material. In some implementations, the sachets are spaced apart along the longitudinal length by between about 0.5 cm and about 50 cm. In some implementations, the sachets are spaced apart along a lateral length of from about 0.5 cm and about 50 cm. Optionally, the sachets include an upper and a lower sheet and the material is disposed between the upper and lower sheet. Optionally, the irradiated material comprises cellulosic or lignocellulosic material. In some implementation the irradiated material has been irradiated with an average dose of ionizing radiation between about 10 and about 150 Mrad. In some implementations, the cellulosic or lignocellulosic material that is enclosed in a web, sachet and/or pouch include, wood, particle board, forestry wastes (e.g., sawdust, aspen wood, wood chips), grasses, (e.g., switchgrass, miscanthus, cord grass, reed canary grass), grain residues, (e.g., rice hulls, oat hulls, wheat chaff, barley hulls), agricultural waste (e.g., silage, canola straw, wheat straw, barley straw, oat straw, rice straw, jute, hemp, flax, bamboo, sisal, abaca, corn cobs, corn stover, soybean stover, corn fiber, alfalfa, hay, coconut hair), sugar processing residues (e.g., bagasse, beet pulp, agave bagasse), algae, seaweed, manure, sewage, and mixtures of any of these.

The methods and systems described herein can be small relative to larger systems, for example, some systems for irradiation of water or food that may require large vaults and or large irradiators. The small size makes these easy to house in, for example, existing plants or new plants for processing materials. The small size also makes the systems easy to transport and can be utilized at one site for a time and then moved to another site (e.g., optionally disassembled prior to moving and then re-assembled at a new location). The material handling systems are also provides easy handling of the material to be treated; for example, the materials to be treated are easy to transport before, after and during the treatment processes. The systems also can be assembled entirely or partially from existing components (e.g., off the shelf components), and or modified off the shelf components can be utilized. Some implementations of the invention allow for processing of comminuted (e.g., particulate) material without the generation of lofted fine particles. Such particles can be detrimental to equipment, such as the widow foils of electron irradiation devices. The invention also can be implemented in such a manner as to provide a very uniform thickness of material that improves dose averaging through the material when it is irradiated. Other advantages include ease of transporting material to be treated and conveying ease, such as conveying under an electron beam during treatment.

Implementations of the invention can optionally include one or more of the following summarized features. In some implementations, the selected features can be applied or utilized in any order while in other implementations a specific selected sequence is applied or utilized. Individual features can be applied or utilized more than once in any sequence and even continuously. In addition, an entire sequence, or a portion of a sequence, of applied or utilized features can be applied or utilized once, repeatedly or continuously in any order. In some optional implementations, the features can be applied or utilized with different, or where applicable the same, set or varied, quantitative or qualitative parameters as determined by a person skilled in the art. For example, parameters of the features such as size, individual dimensions (e.g., length, width, height), location of, degree (e.g., to what extent such as the degree of recalcitrance), duration, frequency of use, density, concentration, intensity and speed can be varied or set, where applicable as determined by a person of skill in the art.

Features, for example, include: a method of treating a material; conveying a web carrying a material through an area of ionizing radiation; a web carries the material in discrete spaced apart sachets or pouches along its longitudinal length; sachets are spaced apart along the longitudinal length by between about 0.5 cm and about 50 cm; sachets are spaced apart along the longitudinal length between about 1 cm and about 25 cm; sachets are spaced apart along the longitudinal length between about 2 cm and about 10 cm; a web carries the material in discrete spaced apart sachets along its lateral length which is substantially perpendicular to its longitudinal length; sachets are spaced apart along a lateral length of from about 0.5 cm and about 50 cm; sachets are spaced apart along a lateral length of from about 1 cm and about 25 cm; sachets are spaced apart along a lateral length of from about 2 cm and about 10 cm; sachets include an upper and a lower sheet wherein a material is disposed between the upper and lower sheet; each upper and lower sheet of a sachet has a thickness of from about 1 mil and about 10 mil; each upper and lower sheet of a sachet has a thickness of from about 2 mil and about 6 mil; each upper and lower sheet of a sachet includes apertures defined therein; apertures in a sheet has a diameter of from about 0.01 mil and about 5 mil; aperture in a sheet has a diameter of from about 0.1 mil and about 3 mil; aperture in a sheet has a diameter of from about 0.5 mil and about 2 mil; a web is formed from a thermoplastic material; a thermoplastic material includes a polyolefin configured to crosslink upon irradiation; a thermoplastic material includes a polyolefin configured to not degrade upon irradiation; a thermoplastic material includes a polyolefin comprising polyethylene; polyethylene utilized is polyethylene homopolymer; polyethylene utilized is linear low density polyethylene; polyethylene utilized is low density polyethylene; polyethylene utilized is high density polyethylene; a web is formed to enclose a material, forming a web carrying material, as the web carrying material is conveyed through an area of ionizing radiation; a web is formed to enclose a material, forming a web carrying material, prior to it being conveyed through the ionizing radiation; ionizing radiation comprises a beam of electrons directed at a web; an area or ionizing radiation has a portion that includes a vibration; an area or ionizing radiation has a portion that includes a vibration configured to evenly spread a material inside sachets or pouches; ionizing radiation is contained in a vault; a vault comprises a steel; a vault comprises a lead/steel composite; a vault defines an irradiation space having a volume of less than about 250 ft$^3$; a vault defines an irradiation space having a volume of less than about 150 ft$^3$; a vault defines an irradiation space having a volume of less than about 125 ft$^3$; a vault defines an irradiation space having a volume of less than about 100 ft$^3$; a vault defines an irradiation space having a volume of less than about 64 ft$^3$; a vault has an internal length and width of less than about 6 feet; a vault has an internal length and width of less than about 5 feet; a vault has an internal length and width of less than about 4 feet; a vault has an internal length and width of less than about 3 feet; a vault has an internal length and width of between about 2 feet and about 7 feet; a vault has an internal length and width of between about 2 feet and about 6 feet; a vault has an internal length and width of between about 3 feet and about 5 feet.

Features, for example, can further include: a method of treating a material; conveying a web and an enclosed material through a beam of ionizing radiation; a material is conveyed on a substantially flat surface in a direction substantially perpendicular to the beam of ionizing radiation; an enclosed material is a lignocellulosic or cellulosic material; a web comprises a synthetic material; a web comprises a synthetic polymer; an enclosed material receives a dose of radiation between about 10 and 150 Mrad of radiation; an enclosed material receives a dose of radiation between about 15 and about 50 Mrad; ionizing radiation is an electron beam radiation; the average energy of electrons in an electron beam is between about 0.5 MeV and about 2 MeV; a web is in the form of a plurality of sachets or pouches that enclose the material; a web enclosed material forms a substantially uniform layer of the enclosed material; a layer thickness of an enclosed material is less than about 1" thick; a layer thickness of an enclosed material is less than about 0.5" thick; a layer thickness of an enclosed material is between about 0.5" and 0.1" thick; a material has an average particle size between about 5 and about 0.1 mm; a web includes a plurality of perforations through an enclosing web; an enclosing web includes a plurality of perforation through the enclosing web and the average size of the perforations is less than average particle size of the enclosed material; releasing a material from an enclosing web and saccharifying the material.

Features, for example, can further include a web consisting of a series of discrete spaced apart sachets arranged longitudinally, the sachets configured to enclose therein an irradiated material; sachets are spaced apart along the longitudinal length by between about 0.5 cm and about 50 cm; sachets are spaced apart along a lateral length of from about 0.5 cm and about 50 cm; sachets include an upper and a lower sheet and the material is disposed between the upper and lower sheet; irradiated material comprises cellulosic or lignocellulosic material; irradiated material has been irradiated with an average dose of ionizing radiation between about 10 and 150 Mrad.

Other features and advantages of the invention will be apparent from the following detailed description, and from the claims.

DESCRIPTION OF THE DRAWINGS

FIG. 3B is a detailed view of a possible web opening configuration. FIG. 3C shows an alternative detailed view of a possible web opening configuration.

FIG. 4A shows possible configuration of a web enclosure structure. FIG. 4B shows an alternative web enclosure structure.

FIG. 5A shows a system for producing a web enclosed material. FIG. 5B is a detailed view of a sealed pouch or sachet. FIG. 5C is an alternative detailed view of a sealed pouch.

FIG. 6 is a diagrammatic depiction of a self-shielded type irradiator that can be used for irradiating a web enclosed material.

DETAILED DESCRIPTION

Using the methods, equipment and or systems described herein, a feedstock (e.g., a cellulosic, lignocellulosic or hydrocarbon containing material), for example, that can be sourced from biomass (e.g., plant biomass, animal biomass, paper, and municipal waste biomass) and hydrocarbon containing material that is often readily available but difficult to process, can be turned into useful products (e.g., sugars such as xylose and glucose, alcohols such as ethanol and butanol, and low molecular weight extractable hydrocarbons). Included are methods and systems for treating materials (e.g., biomass and hydrocarbon-containing materials) utilizing enclosures or structures made with a continuous web to contain the materials while treating the materials with ionizing radiation.

In one or more embodiments, a web is employed to enclose a material that is to be treated by ionizing radiation. The web can be a continuous length that is introduced, e.g., from a spool or mandrel, into and through an ionizing zone. The web can be taken up, e.g., by a mandrel or other device, as the web exits the ionizing zone. The web advantageously encloses the material, e.g., a particulate material, and facilitates its introduction and removal from an ionizing zone. By enclosing the material to be treated in a web, one or more advantages can be realized.

The web contains the particulate material, which reduces the level of airborne particulates. Lowering airborne particulate levels can improve health conditions of humans in proximity to the equipment. In addition, reducing dust levels during processing reduces chances of combustion by airborne particulates. In particular, enclosing the material to be irradiated in a web reduces the chances of overheating the material particles which can damage the irradiation equipment.

Using a continuous web that can be continuously introduced into the ionizing zone, eliminates the need for an additional conveying means, such a tray or conveyor belt, for transport of the material into and out of the ionizing zone. Conveyances used with the ionizing radiation typically are resistant to the high energy and destructive nature of the ionizing radiation, and may require addition shielding or use of equipment specifically adapted to be used in high ionizing environments. The web according to one or more embodiments eliminates the need for costly conveyances, as it can serve to both convey the material through ionizing radiation and contain dust and other airborne particulates.

In addition, the web can be made of a material that is discarded after use, thereby allowing the use of inexpensive webs. In other embodiments, the web can be recycled and reused.

Figure 1:
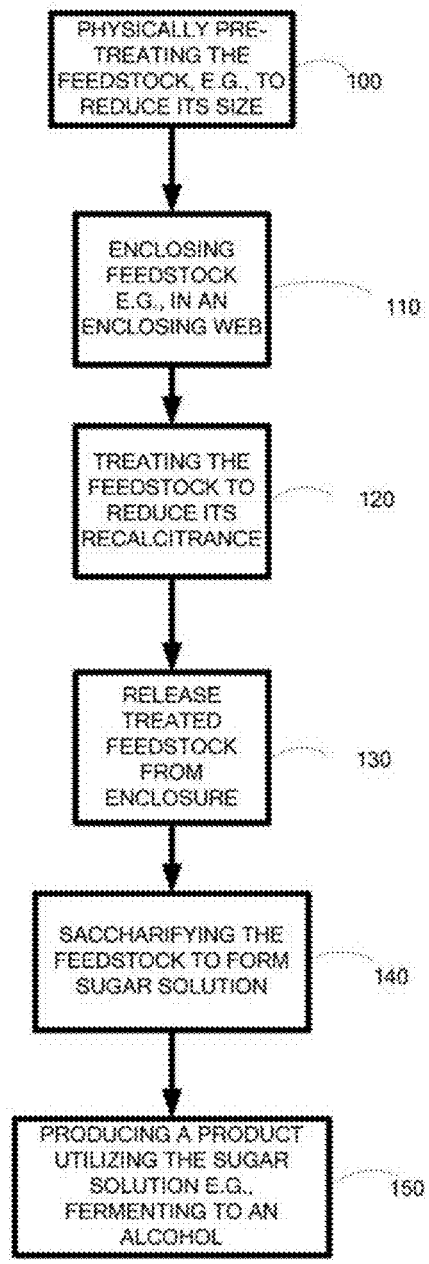
FIG. 1 is a flow diagram showing processes for manufacturing sugar solutions and products derived therefrom.

Referring to FIG. 1, processes for manufacturing sugar solutions and products include, for example, optionally physically treating a cellulosic and/or lignocellulosic feedstock 100, for example, mechanically treating the material to reduce its size (e.g., comminuting). The feedstock can then be enclosed in a structure 110, for example, a continuous web that surrounds the biomass. The enclosed biomass can then be treated with another physical treatment, for example, treated with ionizing radiation, to reduce or further reduce its recalcitrance 120. For example, the enclosed biomass can be conveyed (e.g., using one or more of a belt, rollers and/or vibratory conveyor) under an electron beam. The physical treatment 120 can be repeated until the desired recalcitrance reduction has been achieved, for example, using one irradiation device applied multiple times and/or using multiple devices (e.g., optionally applied one or more times for irradiation). The feedstock can then be released from its enclosure 130, for example, by cutting open the enclosure and allowing the material to spill out of the enclosure into a collecting container. A treated biomass feedstock can then be saccharified 140, for example, by combining the feedstock with water and a chemical and/or biochemical agent. For example, saccharification efficiency and/or extent of saccharification can be improved by the use of acids (e.g., sulfuric, phosphoric, acetic, nitric and/or hydrochloric) and/or enzyme (e.g., cellulase, xylanase and/or protease). Optional steps during saccharification include mixing (e.g., with a jet mixer) and heating; both of which can be applied before, after or while combining with the chemical and/or biochemical agents. Optionally, steps 130 and 140 can be combined; for example, the enclosed biomass material can be fed to a saccharification tank wherein shearing (e.g., by mixing blades), chemical degradation, biochemical degradation and or dissolution of the enclosure web material releases the biomass into solution and the biomass can then be saccharified as described. The enclosing web material (e.g., sheared and/or made into particulates, fibers or other shredded pieces such as sheets), if it is less dense than the biomass material and is present during saccharification or part of the saccharification (e.g., before saccharification commences) can be removed after saccharification by skimming off the surface of the saccharification solution, or it can be removed by other methods described herein (e.g., filtering including vacuum drum filtration). A product can be derived from the sugar solution, for example, by fermentation to an alcohol 150. Further processing can include purifying the solution, for example, by distillation. If desired; the steps of measuring lignin content and setting or adjusting process parameters based on the measurement can be performed at various stages of the process, for example, as described in U.S. Pat. No. 8,415,122 issued Apr. 9, 2013, the entire disclosure of which is incorporated herein by reference. It is understood that the methods described with reference to FIG. 1 can be used or modified to be applicable to treat a wide range of materials. For example, the methods described by steps 100 through 130 can be applied for the treatment of hydrocarbon containing materials, synthetic polymeric materials and/or other items from another manufacturing process. For example, the treatment steps can be useful steps in the recycling of a polymeric material because the step can breakdown polymeric materials to more fundamental units or easier to process materials (e.g., oligomers, monomers, $CO_2$, oxidized material, or de-toxified materials).

Figure 2A:
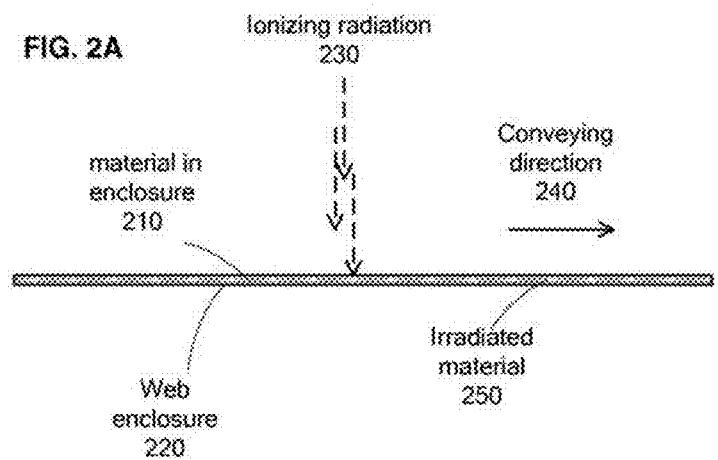
FIG. 2A shows a front view of a method for treating a material.
Figure 2B:
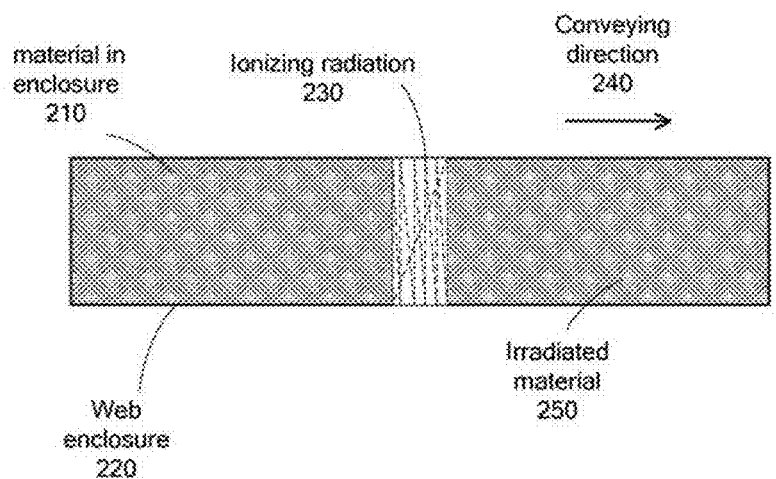
FIG. 2B shows the same method from a top view.

FIG. 2A shows a front side view of a method for treating a material. A material 210 that is enclosed (e.g., wrapped and/or sealed) in a structure made with a continuous web 220. The continuous web and enclosed material are moved under a beam of ionizing radiation 230 and irradiated. The movement can be continuous or incremental. The average conveying direction is shown 240, although the material can be moved in the opposite direction (e.g., for repeated irradiations) or any other direction (e.g., up and down in the direction of the irradiation, or from side to side perpendicular to the irradiation direction and the average conveying direction; for example, to aid in dose averaging). The irradiated material 250 is moved out of the irradiation zone and optionally further processed. FIG. 2B shows the top view to further illustrate the method. The dashed lines indicate a rastering pattern of ionizing radiation, e.g., an electron beam raster pattern, across the surface of the web enclosure containing the material.

Figure 3A:
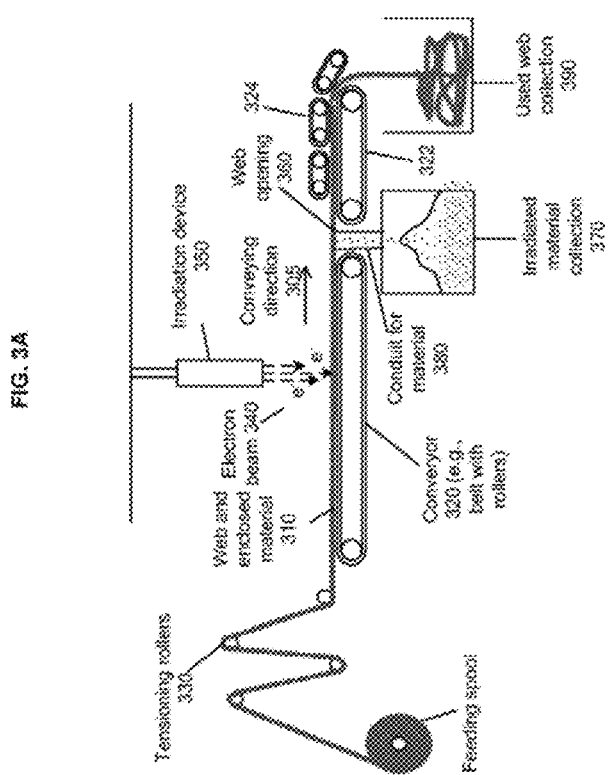
FIG. 3A shows an embodiment of the invention.

FIG. 3A shows an embodiment of the invention. A biomass material enclosed in a web 310 can be conveyed on a conveyor belt 320 in the average direction indicated 305. The web can be rolled up, for example, on a spool which unwinds at a rate commensurate with the conveyor belt 320. In this way the spool feeds the web enclosed material to the conveyor belt and other downstream equipment and processes in a controlled manner. Alternative methods can also be utilized, for example, the web and enclosed material can be in a bin and the material feed to the conveyor 320 with, for example, tensioning rollers disposed opposite each other to compress and pull the material 310 out of the bin. The material 310 can also be placed on the conveyor 320 by a mechanoid (e.g., a robot) and/or a human operator. Clearly, in the option using a human operator, this operation must be done with adequate shielding from and radiation (e.g., with the operator outside of a containment vault where the irradiation processing occurs). In an alternative embodiment, the web material enclosing biomass is formed and then, without any delay (e.g., less than about an hour of delay, less than about 30 min, less than about 20 min, less than about 10 min, less than about 1 min) the web material and biomass are irradiated.

Other conveyor belts or rollers can be used to aid in feeding the enclosed material to the conveyor belt 320. For example, a series of rollers 330 that are tensioned can be helpful to ensure the material in the enclosure is uniformly distributed in the enclosure as well as delivering the material to the conveyor at the correct tension. Additionally, some vibrations can be induced by appropriate equipment (e.g., vibratory conveyors, vibrating rollers, vibrating surfaces) to help distribute the material in the enclosure evenly. The conveyor 310 conveys the web and enclosed material 310 under an electron beam 340 supplied by an irradiation device 350, a part of which at least is suspended from a vault ceiling. Other possible configurations include irradiation from any other side, e.g., the bottom and/or any side and at any angle. Irradiation can even occur simultaneously from multiple directions and/or from different sources (e.g., even mixing the irradiation such as electron beam and gamma radiation).

After irradiation, the web and enclosed material is conveyed to a web opening area 360, where the enclosed material is released by providing openings to the bottom of the web enclosure, allowing the material to drop by gravity into a collection container 370. A conduit 380 can aid in directing the material to the collection container. Additionally or alternatively, a vacuum can be supplied to the collection container to aid in removing the material from the web material. The substantially opened web is then conveyed further downstream, aided by a second conveyor belt 322 as well as conveyors 324 to pull and direct the web into a collection container (e.g., a bin). The conveyor 324 can be pressed against conveyor 322 (e.g., tensioned with a spring, pneumatically or simply weighted) to aid in pulling the web forward.

In some embodiments the web contains an opening or structure (e.g., a zip-lock or fold) that opening area 360 simply operates on. For example, the opening area can unfold a folded structure or open a zip-lock structure. Alternatively, the opening structure on the enclosure can include a mechanical weakness, e.g., a perforation, a weak seal and/or be thinner, so that the opening area can create an opening in the structure more easily by mechanically stressing the material.

Other methods can additionally or optionally be used to aid in pulling or pushing the material through the radiation beam and associated processing (e.g., web opening, web collection). For example, the conveyor belt (e.g., one or more) can be equipped with gripping elements such as sharp pointed pins sticking up from the surface of the conveyor belt that can become imbedded or puncture the enclosure thus gripping the enclosure and pulling it forward. Other methods include a surface that can supply a vacuum under the enclosure, such as a conveyor surface with perforation that can allow a vacuum to be applied underneath the web and enclosed material.

FIG. 3B is a bottom detailed view of the web opening area 360. Web opening, 360, can be accomplished, for example, by a blade 362. The blade, as depicted in FIG. 3B, is wedge shaped, which helps open up a wide gap 366 in the web through which the enclosed material can exit. An alternative configuration is shown by FIG. 3C wherein a series of cutting blades 364 are arranged to cut into the bottom of the web 368. The slitting and shredding of the material allows the enclosed material to exit. In addition or alternatively, other methods of opening the enclosure can be used. For example, the material can be stretched, pulled, ground and/or ripped open, shattered (e.g., after cooling) or ripped with one or more hooks, squeezed out (e.g., extruded through an opening) and/or sheared.

FIG. 4A and FIG. 4B show some possible configurations of the material and web enclosure structures. The material can be contained in a series of sachets or pouches 410 or connected pillow pouches or sachets that are isolated from each other and by a seal 420. The pouches can be arranged in a variety of configurations, for example, the simple series shown in FIG. 4A or the array shown in FIG. 4B. For example, a web material can be arranged as spaced apart sachets or pouches along its longitudinal length wherein the sachets are spaced apart along the longitudinal length by between about 0.5 cm and about 50 cm, e.g., between about 1 cm and about 35 cm, or between about 2 cm and about 10 cm. The web also can be arranged as a series of sachets or pouches in discrete spaced apart sachets or pouches along its lateral length, where the sachets are spaced apart along a lateral length of from about 0.5 cm and about 50 cm, e.g., between about 1 cm and about 25 cm, or between about 2 cm and about 10 cm. For example, the space between the pouches or sachets can be a seal.

Although the sachets or pouches can be rectangular in shape, other shapes can be used. Some optional shapes (e.g., as seen from above or a top view) include circular, square, elliptical or random shapes as well as combinations of shapes can be used. Preferably, the sachets or pouches are designed so that the biomass thickness in the sachets or pouches will be uniform during the irradiation process. As discussed below, in some embodiments the thickness of the biomass material is less than about 1 inch (e.g., less than about 0.75 inches, less than about 0.5 inches, less than about 0.25 inches, less than about 0.1 inches, between about 0.1 and 1 inch, between about 0.2 and 0.3 inches).

Sealing can be, for example, by heat sealing, stitching, application of pressure sensitive adhesive or combinations of these. With regards to the seal, the seal can optionally be made weak by design so as to be mechanically easy to open.

Although in some embodiments, the web material forming the enclosure is made of a single sheet of a single composition, in alternative embodiments, the enclosure can be constructed with more than one sheet and include more than one type of material. For example, a top sheet (e.g., an upper sheet) and a bottom sheet (e.g., a lower sheet) can be made of the same or a different type of material. In some embodiments more than one layer of material can be used to make the sheets, for example, to provide mechanical strength and or chemical protection.

Preferably, the material to be treated is a particulate material and it placed in the enclosure so that it can be conveyed under the irradiation beam as a uniform layer of material. The average particle size of the material can be above at least about 0.25 mm (e.g., at least about 0.5 mm, at least about 0.75 mm) and below about 10 mm (e.g., below about 6 mm, below about 5 mm, below about 4 mm, below about 3 mm, below about 2 mm).

Although roughly spherical particles are often applicable in the embodiments, other shapes such as more fibrous elongated shapes, plate like shapes, cylindrical shaped, ellipsoid, lozenge, can also be used or combinations of these morphologies or other morphologies can be used. More important than the actual shape of the individual particles, is that it is preferable that the material can form a uniform layer in the enclosure that presents a substantially uniformly thick profile to the irradiation beam as previously discussed.

The material to be treated is enclosed in a web by any useful method. Preferred embodiments include continuous methods such as form fill and seal methods or modifications thereof. The methods can be implemented by using commercial or modifying existing commercial equipment. For example, commercial equipment used for forming pillow bags, tray sealers, blister packages or other kinds of enclosures used in the confectionary, feed, pharmaceutical and/or food industries. For example, equipment made by Ossid Corporation (NC, USA), SACMI IMOLA (Italy), Bosch USA (Michigan, USA), Starview Packaging Inc. (Quebec, Canada), Circle Packaging Machinery Inc. (WI, USA) and Reiser (MA, USA).

Form, fill and seal methods are continuous methods that are convenient methods that can be used. Two types of form fill and seal machines are vertical form fill seal machines and horizontal form fill and seal machines. Vertical Form Fill and Seal machines are particularly useful for enclosing products where gravity can assist in the filling, such as liquids and flowable particle materials. Horizontal type enclosing machines benefit from the fact that products can be conveyed positively into a pack and so position and speed can be controlled more accurately. However, Horizontal Form Fill Seal machines require the material to be enclosed to either be a single part or it must be placed in a tray or some other supporting structure. For example, a single part could be a particulate feedstock that has been compressed into a shape optionally with a binder, for example, a sheet, pellet or brick of compressed material.

FIG. 5A shows Vertical Form Fill Seal system and how this system can be used to produce an enclosed material in a continuous web. In this method a forming collar 502 shapes a flat film 504 (e.g., of web material) around a forming tube 506 into a round film tube 508. Vertical sealing bars 510 seal the edges of the film tube together. For example, a web material that includes a thermoplastic can be heat sealed. A film transport system such as one or more film transport belts 512 increments the film forward between sachet or pouch sealing steps. A cross sealing jaw 514 can seal the bottom of a sachet or pouch before it is filled 516 while sealing a top of a filled sachet or pouch 518. The material is portioned into a sachet or pouch 516 in the filling step. The material can be portioned by any useful method such as by weight, flow control or volume control. For example, a hopper (not shown) can meter the correct volume or weight of material into the forming tube, or a weighing system can be integrated with the sealing jaws to increment the system (e.g., biomass adding systems, film transport belts and sealing bars/jaws) forward. The filled pouches are collected or further processed 530, for example, by winding onto a spool or placing in a container. Optionally the pouches are transported directly using, for example, a conveyer for further processing (e.g., such as irradiation).

Figure 5D:
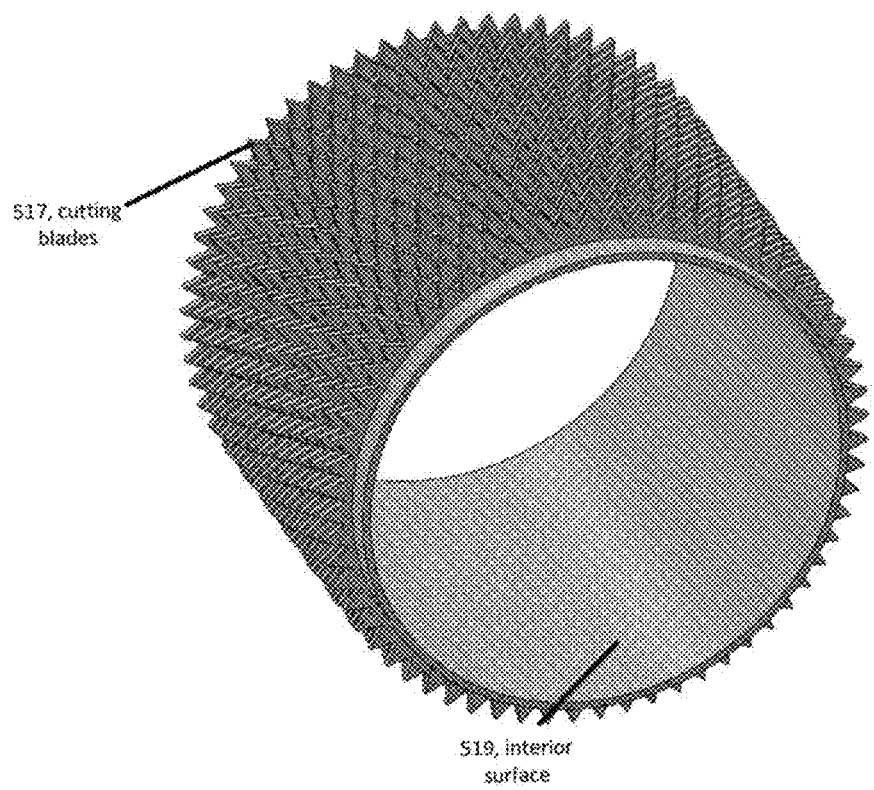
FIG. 5D shows an isometric view of a rotary micro-perforation die.
Figure 5E:
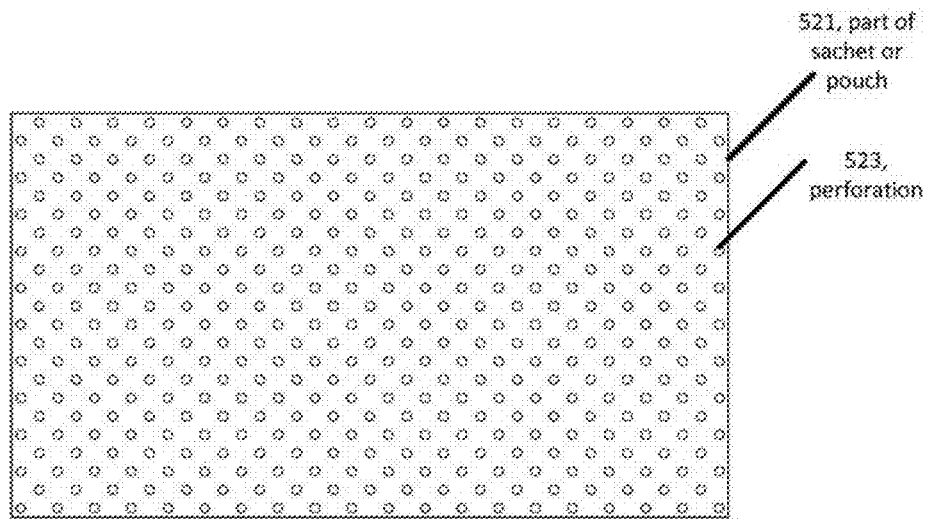
FIG. 5E is a top view of a section of a sachet or pouch with apertures.

Optionally, as shown in FIG. 5A, the sachets or pouches can be perforated. For example, a perforating jaw 520 can be connected to the Cross sealing jaws (e.g., mechanically connected or actuated by) so that each individual pouch is perforated with a plurality of holes or apertures. These holes are preferably made to be smaller than the particles of the material in the pouches. For example, they can be less than 80% of the average particle size (e.g., less than about 50%, less than about 10%). For example, the perforations or apertures can have diameters from about 0.01 mil and about 5 mil, e.g., about 0.1 mil and about 3 mil or between about 0.5 mil and about 2 mil. The perforations can all be approximately equal in size and shape (for example, within 5% in diameter) or the perforations can be different in size and shape. The perforations can be on a top sheet, bottom sheet and or the sides of a sachet or pouch. The holes should be large enough to allow gas molecules (e.g., air, volatile organic compounds, vapor) to pass in and/or out of the sachets or pouches. The perforating jaws or other perforation device can cover the entire sachet or pouch or just a portion of the sachet or pouch (e.g., making holes on the entire surface or on just a portion of the surface area of the sachet or pouch. The holes can be made on one or more sides of the sachet or pouch. Other configurations for producing a perforated sachet or pouch include, but are not limited to, using a belt system (e.g., the film transport belts can have sharp dimples or pins thereupon for cutting into the film as it is moved forward) or rollers with sharp dimples, pins and/or blades. For example, a rolling micro-perforator and/or rotary die cutting tools and systems. Micro-perforators, for example, can be purchased from Shober (USA). A die for a rotary micro-perforation system is shown I FIG. 5D. For example, cutting blades 517 are arranged pointing radially outwards from the cylindrical die. The die has an interior cylindrical surface 519 that can be mounted on a stationary fit with bearings or an axel that rotates with the die. For example, the perforating systems described here can be used to make perforations in a sachet or pouch, for example, as shown in FIG. 5E. In this figure a portion of a sachet or pouch (defined by the boundary line 521) is shown as a top view wherein the outline of perforations 523 are shown. The sharp dimples, blades or pins (for example, on a conveyor or roller) can even serve the purpose of helping convey the web and enclosed material forward as described previously. Optionally, the film can be provided in a perforated form or perforated just prior to its being formed into the tube by the form fill seal system.

The sachets, pouches and/or web enclosing a material, can be formed and then immediately irradiated. For example, as system as describe with reference to FIG. 5A can feed the continuous web directly to a vault for irradiation. In such a configuration, the enclosed material is not stored prior to irradiation.

Two kinds of pillows or pouches are shown for the embodiment represented by FIG. 5A. The system as described with reference to FIG. 5A can at least make these two kinds of pouches, preferably one kind of pouch is made in series at one time since some adjustments of the equipment and material can be required to change the pouch type. The pouches are shown as detailed views FIG. 5B and FIG. 5C. FIG. 5B shows a standard pouch while FIG. 5C shows a pouch with a side Gusset. The side gusset pouches can help in forming a more uniform layer of material in the pouch when they are laid down, for example, on a conveying surface. The cross seal 550 produced by the cross sealing jaw and vertical seal 560 produced by the vertical sealing jaw are shown in FIGS. 5B and 5C.

The irradiation methods generally require shielding from potential harmful radiation. In some embodiment large vaults can be utilized. In alternative embodiments, self-shielded type irradiators can be utilized. FIG. 6 shows a self-shielded type irradiator 600 that can be used for irradiating a web enclosed material. The shielding material 602 is effective in reducing or preferably eliminating any radiation (e.g., X-rays) from exiting the irradiator. For example, the shielding walls 602 can be made of lead and/or steel (e.g., lead steel composites), or, for example, any material as described in this disclosure used for irradiation vaults. In this particular embodiment of the invention, a web enclosing material can be made to enter (e.g., conveyed) into a shielding room 610 of the self-shielded irradiator 600, for example, through ingress 612. The web enclosed material is then conveyed into a radiation chamber 620 through ingress 622. The web enclosed material can be directed, for example, by tensioning rollers 614 through the ingress 612 and ingress 622 and onto conveyor 624. The conveyor is optional and can be a conveyor as previously described (e.g., a belt conveyor, vibratory conveyor). The web enclosed material is irradiated, for example, with electron beam 626. The beam can be rastered across the surface and into the web enclosed material using scanning horn 628. Electron accelerator 630 and DC power supply 632 can be placed outside of the shielding material 602 and an electron conduit, e.g., 634 allows the accelerated electrons to enter the irradiation chamber. The irradiated web enclosed material is conveyed out of the irradiation chamber through egress 636, through a shielding room 613 and out through egress 638. Other features shown in the figure include a beam dump/beam catcher 640 which is disposed below the scanning horn to adsorb any irradiation that is not adsorbed by the material to be treated or conveyor. Beam dumps can be, for example, as described below. A cooling system that blows a cooling gas using a blower 642 (e.g., air, nitrogen, argon, helium and mixtures thereof) across the window foils of the electron extractor of the scanning horn is shown, the direction of flow indicated by the unfilled arrows. The gas conduit 644 and manifold 646 are shown. An egress 648 for the process gasses (e.g., including ozone and volatile organic compounds) is connected to a chimney and/or a process gas mitigation system (e.g., ozone abatement system).

There can be more than one shielding room 612 before the web enclosed material enters the irradiation chamber 620. There can also be more than one shielding room 613 after the irradiated enclosed material exits the irradiation chamber. The purpose of the shielding room is to provide a non-linear path between any point source of radiation in the irradiation chamber and ingress 612 or egress 638. For example, a point source can be produced on the conveyor, the beam dump, or the irradiated material where an electron undergoes breaking radiation and produced X-rays which emanated radially out of these point sources. The arrangements of the egress/ingress 612, 622, 636 and 638 as well as the positioning of any equipment such as the conveyor, beam dump and scanning horn can be arranged to ensure no radiation escapes from the self-shielded irradiator.

The self-shielded irradiator can include more than one irradiation chamber, for example, with a cooling system between irradiation chambers.

The shelf-shielded type irradiator can be substantially kept under an inert gas, such as nitrogen, argon and/or He to reduce or eliminate the production of ozone. For example, the window cooling gas can be an inert gas than, along with cooling the window foils, keeps a positive pressure of inert gas in interior of the self-shielded irradiator. The can be done, for example, by controlling the flow of the inert gas into self-shielded irradiator and out of the irradiated, to maintain a positive pressure of inert gas in the irradiator.

Self-shielding irradiators or any type of vault for irradiation in the methods and systems described herein can be small, having a volume of less than about 250 ft$^3$ (e.g., less than about 150, 125, 100 or even less than 64 ft$^3$). These can also have an internal length and width of less than about 6 feet, e.g., less than about 5, 4 or even 3 feet, such as between 2 feet and 7 feet or between 2 feet and 6 feet or between 3 feet and 5 feet.

The self-shielding irradiators or vaults for irradiation can be made utilizing steel, for example, a lead/steel composite.

Optionally the individual pouches can be separated, for example, by cutting through the center (e.g., approximately through the center, so that the cut does not actually open the enclosure) of the cross seal. This can be an integrated step done with the cross sealing step or a separate step. It can be advantageous to not separate the pouches since keeping them together can make it easier to further process the material since they are trained together in a connected series (e.g., a train of pouches).

Optionally the enclosure with material can be filled with a gas, for example, an inert gas such as argon, hydrogen, helium or mixtures thereof. The enclosures with enclosed material can also optionally be evacuated, (e.g., vacuum sealed). The enclosures/enclosed material can be compressed, for example, in a press to 30 psig or more (e.g., more than 100 psig, more than 200 psig, more than 500 psig, more than 1000 psig). The compression can be applied with heating and/or evacuation of gases in the pouch.

The enclosures are preferably made of a web material. For example, the web material can include polymers such as thermoset and thermoplastics. For example, polymers that can be used include Polyamideimide (PAI e.g., Torlon®); Polyimide (PI e.g., Aurum®); Polyethersulfone (PES); Polyetherimide (PEI); Polysulfone (PSO); Polycarbonate (PC); Polyetheretherketone (e.g., PEEKED); Polyphthalamide (PPA); Polytetrafluoroethylene (PTFE); Polystyrene (PS); Acrylonitrilebutadienestyrene (ABS); Polyphenylene Sulfide (PPS); Polyvinyl Chloride (PVC); Polyamide (PA); Polyamide 6/6 (PA-6,6); Polyamide 4,6 (PA); Acrylonitrilebutadienestyrene (ABS); Fluoropolymers (FP); high density polyethylene (HDPE); liquid crystal polymers (LCP); low density polyethylene (LDPE); polyarylate (PAR); polybutylene terephthalate (PBT); polycarbonate (PC); polyethylene terephthalate (PET); polymethyl methacrylate (PMMA); polyoxymethylene (POM); polypropylene (PP); polyphthalate carbonate (PPC); polyphenylene oxide (PPO); polyphenylsulfone (PPSU); polysulfone (PSF); polyvinylidene fluoride (PVDF); styrene acrylonitrile (SAN); styrene maleic anhydride (SMA); thermoplastic polyimide (TPI), polyvinyl alcohols (PVA), polyurethanes (PU), polyvinyl acetate (PVA) and polysaccharides. Some preferred web materials include thermoplastics such as polyolefin, such as polyethylene homopolymer (PE), linear low density polyethylene (LLDPE), low density polyethylene (LDPE) and high density polyethylene (HDPE). For example, polyolefin configured to crosslink upon irradiation and not degrade upon irradiation.

The polymers used to make the web can be cross linked, for example, to improve structural properties and/or decrease permeability to gases and liquids.

Biodegradable polymers can also be used as the web material, for example, poly esters such as those based on polylactic acid (PLA), polyglycolide (PGA), polycaprolactone (PCL). Other bio and environmentally degradable polymers include poly(hydroxyalkanoates)s; modified poly (saccharides) such as starch, cellulose and chitosan; and lignin or combinations and/or mixtures thereof. For example, polymers that can be utilized include Poly(ethylene glycol) methyl ether-block-poly(D,L lactide); Poly(ethylene glycol) methyl ether-block-poly(D,L lactide)-block-decane; Poly(ethylene glycol)-block-polylactide methyl ether; Poly(ethylene glycol)-block-polylactide methyl ether; Poly(ethylene oxide)-block-polylactide, 4-arm poly(ethylene oxide); Poly(L-lactide)-block-poly(ethylene glycol)m-ethyl ether polylactide; Poly(ethylene glycol) methyl ether-block-poly(lactide-co-glycolide); Poly(ethylene glycol) methyl ether-block-poly(lactide-co-glycolide); Poly(ethylene glycol) methyl ether-block-poly(lactide-co-glycolide); Poly(ethylene glycol)-block-poly(s-caprolactone) methyl ether; Poly(ethylene oxide)-block-polycaprolactone, 4-arm; Polylactide-block-poly(ethylene glycol)-block-polylactide; Polylactide-block-poly(ethylene glycol)-block-polylactide and Poly(lactide-co-glycolide)-block-poly(ethylene glycol)-block-poly(lactide-co-glycolide). Some biodegradable polymers that are derived from non-petroleum sources can be used and are discussed in U.S. Provisional Application 61/816,664 filed Apr. 26, 2013 the entire disclosure of which is incorporated herein by reference. In some embodiments, the treatment (e.g., irradiation) helps degrade the polymer that can then be utilized in further processing, such as a nutrient for an organism.

The web can also include fibrous material including cellulose, lignocellulose carbon fibers, metal fibers and ceramic fibers. The web material can include paper and all compounds typically associated with paper such as fillers.

The web material can comprise of a woven material, for example, made from woven natural or synthetic threads. For example, web material can be made of burlap or canvas (e.g., Jute, hemp or cotton). The web material can be in the form of a net.

The enclosures can be coated and/or infused, for example, with low molecular weight polymers and waxes. The coating can be applied to improve structural or mechanical properties, to improve chemical resistance, to impart water resistance, to make the material impervious to gases, to increase the friction of the outer and/or inner surface, to decrease the friction of the inner and/or outer surface, to decrease static charge that might develop, to improve sealing properties (e.g., heat sealing) and/or to interact with the irradiation (e.g., to scatter the radiation and create heating). The coatings can be uniformly applied or non-uniformly applied on the surface, applied as a pattern (e.g., strips) or applied only to portions of the pouch.

Typically the web is made to be as thin as possible to save costs and reduce wasted energy due to irradiation of the enclosure material. For example, the material is made thick enough to have enough structural integrity to withstand the processing, but not so thick as to impact the irradiation of the material inside the enclosure significantly. In selecting the exact thickness, the kind of material and treatment can be taken into consideration. For example, materials with higher electron contents (electrons per unit mass) will have higher absorbed doses near the entrance surface when treated with an electron beams, but the electron ranges will be lower. For example, materials with higher hydrogen contents, such as polyethylene $(H_4C_2)_n$ and polypropylene $(H_6C_3)_n$, will have higher surface doses and shorter electron ranges than some other materials, such as polystyrene $(H_8C_8)_n$, polycarbonate $(H_{14}C_{16}O_3)_n$ and polytetrafluoroethylene $(C_2F_4)_n$. With regards to mechanical strength, polyethylene can be made as made less than about 30 miles thick (e.g., less than about 10 mils, less than about 10 mils, less than about 5 mils, less than about 4 mils, less than about 3 mils thick, less than about 2 mils thick, less than about 1 mils thick or even less than about half a mill thick). In some preferred embodiments, the web material (e.g., for making sachets or pouches) has a sheet thickness between 1 mil and about 10 mil (e.g., between about 1 mil and about 8 mil, between about 2 mil and about 6 mil). As an example, a 5 mil thick polyethylene can provide a high degree of protection and tear resistance during shipping, while a 0.5 mil thick material will have minimal structural integrity and a very low electron adsorption.

The enclosing web material can include one or more layers. For example, the layers can be compositionally equivalent or compositionally different.

In some embodiments material that readily degrades under the processing (e.g., irradiation) is favored for making the web since it can be more easily comminuted or ripped opened for further processing. In these embodiments it may be preferable to utilize web materials that will typically undergo chain scissioning when treated with ionizing radiation, for example, polyisobutylene, polymethacrylates, polymethylstyrene, polymethacrylamides, polyvinylidene chloride, polytetrafluoroethylene, polypropylene ether, cellulose In some embodiments the web and enclosed material are stored prior to processing. In these embodiments, material that cross links during processing can be preferred since such cross linking can improve the strength of the material that might be useful during any shipping, storage or conveying. In these embodiments it may be preferable to utilize web materials that typically will cross link during irradiation with ionizing radiation, for example, polyethylene, polyacrylates, polyvinyl chlorides, polysiloxanes, polyamides, polystyrenes, polyacrylamides, and ethylene vinylacetate.

A combination of the above materials can produce a material that is both strengthened (e.g., cross linked) and degraded (e.g., chain scission). For example, an enclosure in the form of a pouch with one area (e.g., a first surface or side) made of polyethylene and a different area (e.g., an facing surface or side to the first surface or side) made of a cellulosic material. The irradiation can strengthen the polyethylene web while degrade the cellulosic web. The cellulosic web can then be more easily opened (e.g., ripped or cut), to remove the contents in the enclosure.

Biodegradable polymers or polymers that can supply a nutrient useful for further processing such as fermentation can be useful.

In some embodiments, the enclosed material is treated, e.g., with electron beam irradiation, and then the treated material is contacted with an enzyme without releasing the treated feedstock from the enclosure. For example, after treating the material, the enclosure is combined with a solution containing an enzyme and the saccharification is allowed to proceed partially or completely while enclosed. To contact the treated material an opening is supplied to the enclosed material, for example, by a slit or by, for example, an injection of the enzyme solution into the enclosure using an injection system (e.g., a syringe). For example, the enclosures can be separated into individual pouches that can be utilized as individual bioreactor for the saccharification step. Other steps can be performed using the enclosure after or before saccharification e.g., fermentation by the addition of an organism such as a yeast. A possible embodiment includes the enclosure forming a liner so that the enclosure and treated material are placed into a reactor with walls/bottom that can support the enclosure and contents. The top of the enclosure can be opened so as to allow a mixing shaft with mixer to be inserted or any other equipment (e.g., temperature probe, atmosphere probe such as an oxygen probe, pH probe and selective or non-selective ion probe). The opening can also allow sampling, e.g., for the purpose of monitoring the progress of the reaction, or the opening can also be used for the addition of nutrients, adjusting of pH, adjusting of electrolytes adding of enzymes.

Some more details and reiterations of processes for treating a feedstock that can be utilized, for example, with the embodiments already discussed above, or in other embodiments, are described in the following disclosures.

Systems for Treating a Feedstock

Processes for conversion of a feedstock to sugars and other products, in which the conveying methods discuss above may be used, can include physically pre-treating the feedstock, e.g., to reduce its size, before and/or after this treatment, optionally or additional treating the feedstock to reduce or further reduce its recalcitrance (e.g., by irradiation, sonication, pyrolysis, oxidation, steam explosion), and saccharifying the feedstock to form a sugar solution. Saccharification can be performed by mixing a dispersion of the feedstock (e.g., the feedstock provided from the enclosed material as previously discussed) in a liquid medium, e.g., water with an enzyme, as will be discussed in detail herein. Prior to treatment with an enzyme, pretreated biomass can be subjected to hot water and pressure (e.g., 100-150 deg C., 100-140 deg C. or 11-130 deg C. and associated pressure), and/or an acid (e.g., about 0.01 to 1% $H_3PO_4$, about 0.05 to 0.5% $H_3PO_4$ e.g. about 0.1% $H_3PO_4$). During or after saccharification, the mixture (if saccharification is to be partially or completely performed en route) or solution can be transported, e.g., by pipeline, railcar, truck or barge, to a manufacturing plant. The saccharification can even occur in the enclosures, as previously discussed. At the plant, the solution can be bioprocessed, e.g., fermented, to produce a desired product or intermediate, which can then be processed further, e.g., by distillation. The individual processing steps, materials used, and examples of products and intermediates that may be formed will be described in detail below.

Radiation Treatment

The feedstock can be treated with radiation to modify its structure to reduce its recalcitrance. Such treatment can, for example, reduce the average molecular weight of the feedstock, change the crystalline structure of the feedstock, and/or increase the surface area and/or porosity of the feedstock. Radiation can be by, for example, electron beam, ion beam, 100 nm to 28 nm ultraviolet (UV) light, gamma or X-ray radiation. Radiation treatments and systems for treatments are discussed in U.S. Pat. No. 8,142,620 and U.S. patent application Ser. No. 12/417,731, the entire disclosures of which are incorporated herein by reference.

Each form of radiation ionizes the biomass via particular interactions, as determined by the energy of the radiation. Heavy charged particles primarily ionize matter via Coulomb scattering; furthermore, these interactions produce energetic electrons that may further ionize matter. Alpha particles are identical to the nucleus of a helium atom and are produced by the alpha decay of various radioactive nuclei, such as isotopes of bismuth, polonium, astatine, radon, francium, radium, several actinides, such as actinium, thorium, uranium, neptunium, curium, californium, americium, and plutonium. Electrons interact via Coulomb scattering and bremsstrahlung radiation produced by changes in the velocity of electrons.

When particles are utilized, they can be neutral (uncharged), positively charged or negatively charged. When charged, the charged particles can bear a single positive or negative charge, or multiple charges, e.g., one, two, three or even four or more charges. In instances in which chain scission is desired to change the molecular structure of the carbohydrate containing material, positively charged particles may be desirable, in part, due to their acidic nature. When particles are utilized, the particles can have the mass of a resting electron, or greater, e.g., 500, 1000, 1500, or 2000 or more times the mass of a resting electron. For example, the particles can have a mass of from about 1 atomic unit to about 150 atomic units, e.g., from about 1 atomic unit to about 50 atomic units, or from about 1 to about 25, e.g., 1, 2, 3, 4, 5, 10, 12 or 15 atomic units.

Gamma radiation has the advantage of a significant penetration depth into a variety of material in the sample.

In embodiments in which the irradiating is performed with electromagnetic radiation, the electromagnetic radiation can have, e.g., energy per photon (in electron volts) of greater than $10^2$ eV, e.g., greater than $10^3$, $10^4$, $10^5$, $10^6$, or even greater than $10^7$ eV. In some embodiments, the electromagnetic radiation has energy per photon of between $10^4$ and $10^7$, e.g., between $10^5$ and $10^6$ eV. The electromagnetic radiation can have a frequency of, e.g., greater than $10^{16}$ Hz, greater than $10^{17}$ Hz, $10^{18}$, $10^{19}$, $10^{20}$, or even greater than $10^{21}$ Hz. In some embodiments, the electromagnetic radiation has a frequency of between $10^{18}$ and $10^{22}$ Hz, e.g., between $10^{19}$ to $10^{21}$ Hz.

Electron bombardment may be performed using an electron beam device that has a nominal energy of less than 10 MeV, e.g., less than 7 MeV, less than 5 MeV, or less than 2 MeV, e.g., from about 0.5 to 1.5 MeV, from about 0.8 to 1.8 MeV, or from about 0.7 to 1 MeV. In some implementations the nominal energy is about 500 to 800 keV.

The electron beam may have a relatively high total beam power (the combined beam power of all accelerating heads, or, if multiple accelerators are used, of all accelerators and all heads), e.g., at least 25 kW, e.g., at least 30, 40, 50, 60, 65, 70, 80, 100, 125, or 150 kW. In some cases, the power is even as high as 500 kW, 750 kW, or even 1000 kW or more. In some cases the electron beam has a beam power of 1200 kW or more, e.g., 1400, 1600, 1800, or even 3000 kW.

This high total beam power is usually achieved by utilizing multiple accelerating heads. For example, the electron beam device may include two, four, or more accelerating heads. The use of multiple heads, each of which has a relatively low beam power, prevents excessive temperature rise in the material, thereby preventing burning of the material, and also increases the uniformity of the dose through the thickness of the layer of material.

It is generally preferred that the bed of biomass material has a relatively uniform thickness. In some embodiments the thickness is less than about 1 inch (e.g., less than about 0.75 inches, less than about 0.5 inches, less than about 0.25 inches, less than about 0.1 inches, between about 0.1 and 1 inch, between about 0.2 and 0.3 inches).

It is desirable to treat the material as quickly as possible. In general, it is preferred that treatment be performed at a dose rate of greater than about 0.25 Mrad per second, e.g., greater than about 0.5, 0.75, 1, 1.5, 2, 5, 7, 10, 12, 15, or even greater than about 20 Mrad per second, e.g., about 0.25 to 20 Mrad per second. Higher dose rates allow a higher throughput for a target (e.g., the desired) dose. Higher dose rates generally require higher line speeds, to avoid thermal decomposition of the material. In one implementation, the accelerator is set for 3 MeV, 50 mA beam current, and the line speed is 24 feet/minute, for a sample thickness of about 20 mm (e.g., comminuted corn cob material with a bulk density of 0.5 g/cm$^3$).

In some embodiments, electron bombardment is performed until the material receives a total dose of at least 0.1 Mrad, 0.25 Mrad, 1 Mrad, 5 Mrad, e.g., at least 10, 20, 30 or at least 40 Mrad. In some embodiments, the treatment is performed until the material receives a dose of from about 10 Mrad to about 50 Mrad, e.g., from about 20 Mrad to about 40 Mrad, or from about 25 Mrad to about 30 Mrad. In some implementations, a total dose of 25 to 35 Mrad is preferred, applied ideally over a couple of passes, e.g., at 5 Mrad/pass with each pass being applied for about one second. Cooling methods, systems and equipment can be used before, during, after and in between radiations, for example, utilizing a cooling screw conveyor and/or a cooled vibratory conveyor.

Using multiple heads as discussed above, the material can be treated in multiple passes, for example, two passes at 10 to 20 Mrad/pass, e.g., 12 to 18 Mrad/pass, separated by a few seconds of cool-down, or three passes of 7 to 12 Mrad/pass, e.g., 5 to 20 Mrad/pass, 10 to 40 Mrad/pass, 9 to 11 Mrad/pass. As discussed herein, treating the material with several relatively low doses, rather than one high dose, tends to prevent overheating of the material and also increases dose uniformity through the thickness of the material. In some implementations, the material is stirred or otherwise mixed during or after each pass and then smoothed into a uniform layer again before the next pass, to further enhance treatment uniformity.

In some embodiments, electrons are accelerated to, for example, a speed of greater than 75 percent of the speed of light, e.g., greater than 85, 90, 95, or 99 percent of the speed of light.

In some embodiments, any processing described herein occurs on lignocellulosic material that remains dry as acquired or that has been dried, e.g., using heat and/or reduced pressure. For example, in some embodiments, the cellulosic and/or lignocellulosic material has less than about 25 wt. % retained water, measured at 25° C. and at fifty percent relative humidity (e.g., less than about 20 wt. %, less than about 15 wt. %, less than about 14 wt. %, less than about 13 wt. %, less than about 12 wt. %, less than about 10 wt. %, less than about 9 wt. %, less than about 8 wt. %, less than about 7 wt. %, less than about 6 wt. %, less than about 5 wt. %, less than about 4 wt. %, less than about 3 wt. %, less than about 2 wt. %, less than about 1 wt. %, or less than about 0.5 wt. %.

In some embodiments, two or more ionizing sources can be used, such as two or more electron sources. For example, samples can be treated, in any order, with a beam of electrons, followed by gamma radiation and UV light having wavelengths from about 100 nm to about 280 nm. In some embodiments, samples are treated with three ionizing radiation sources, such as a beam of electrons, gamma radiation, and energetic UV light. The biomass is conveyed through the treatment zone where it can be bombarded with electrons.

It may be advantageous to repeat the treatment to more thoroughly reduce the recalcitrance of the biomass and/or further modify the biomass. In particular the process parameters can be adjusted after a first (e.g., second, third, fourth or more) pass depending on the recalcitrance of the material. In some embodiments, a conveyor can be used which includes a circular system where the biomass is conveyed multiple times through the various processes described above. In some other embodiments multiple treatment devices (e.g., electron beam generators) are used to treat the biomass multiple (e.g., 2, 3, 4 or more) times. In yet other embodiments, a single electron beam generator may be the source of multiple beams (e.g., 2, 3, 4 or more beams) that can be used for treatment of the biomass.

The effectiveness in changing the molecular/supermolecular structure and/or reducing the recalcitrance of the carbohydrate-containing biomass depends on the electron energy used and the dose applied, while exposure time depends on the power and dose. In some embodiments, the dose rate and total dose are adjusted so as not to destroy (e.g., char or burn) the biomass material. For example, the carbohydrates should not be damaged in the processing so that they can be released from the biomass intact, e.g. as monomeric sugars.

In some embodiments, the treatment (with any electron source or a combination of sources) is performed until the material receives a dose of at least about 0.05 Mrad, e.g., at least about 0.1, 0.25, 0.5, 0.75, 1.0, 2.5, 5.0, 7.5, 10.0, 15, 20, 25, 30, 40, 50, 60, 70, 80, 90, 100, 125, 150, 175, or 200 Mrad. In some embodiments, the treatment is performed until the material receives a dose of between 0.1-100 Mrad, 1-200, 5-200, 10-200, 5-150, 50-150 Mrad, 5-100, 5-50, 5-40, 10-50, 10-75, 15-50, 20-35 Mrad.

In some embodiments, relatively low doses of radiation are utilized, e.g., to increase the molecular weight of a cellulosic or lignocellulosic material (with any radiation source or a combination of sources described herein). For example, a dose of at least about 0.05 Mrad, e.g., at least about 0.1 Mrad or at least about 0.25, 0.5, 0.75, 1.0, 1.5, 2.0, 2.5, 3.0, 3.5, 4.0, or at least about 5.0 Mrad. In some embodiments, the irradiation is performed until the material receives a dose of between 0.1 Mrad and 2.0 Mrad, e.g., between 0.5 Mrad and 4.0 Mrad or between 1.0 Mrad and 3.0 Mrad.

It also can be desirable to irradiate from multiple directions, simultaneously or sequentially, in order to achieve a desired degree of penetration of radiation into the material. For example, depending on the density and moisture content of the material, such as wood, and the type of radiation source used (e.g., gamma or electron beam), the maximum penetration of radiation into the material may be only about 0.75 inch. In such instances, a thicker section (up to 1.5 inch) can be irradiated by first irradiating the material from one side, and then turning the material over and irradiating from the other side. Irradiation from multiple directions can be particularly useful with electron beam radiation, which irradiates faster than gamma radiation but typically does not achieve as great a penetration depth.

Radiation Opaque Materials

As previously discussed, the invention can include processing the material in a vault and/or bunker that is constructed using radiation opaque materials. In some implementations, the radiation opaque materials are selected to be capable of shielding the components from X-rays with high energy (short wavelength), which can penetrate many materials. One important factor in designing a radiation shielding enclosure is the attenuation length of the materials used, which will determine the required thickness for a particular material, blend of materials, or layered structure. The attenuation length is the penetration distance at which the radiation is reduced to approximately 1/e (e=Euler's number) times that of the incident radiation. Although virtually all materials are radiation opaque if thick enough, materials containing a high compositional percentage (e.g., density) of elements that have a high Z value (atomic number) have a shorter radiation attenuation length and thus if such materials are used a thinner, lighter shielding can be provided. Examples of high Z value materials that are used in radiation shielding are tantalum and lead. Another important parameter in radiation shielding is the halving distance, which is the thickness of a particular material that will reduce gamma ray intensity by 50%. As an example for X-ray radiation with an energy of 0.1 MeV the halving thickness is about 15.1 mm for concrete and about 2.7 mm for lead, while with an X-ray energy of 1 MeV the halving thickness for concrete is about 44.45 mm and for lead is about 7.9 mm. Radiation opaque materials can be materials that are thick or thin so long as they can reduce the radiation that passes through to the other side. Thus, if it is desired that a particular enclosure have a low wall thickness, e.g., for light weight or due to size constraints, the material chosen should have a sufficient Z value and/or attenuation length so that its halving length is less than or equal to the desired wall thickness of the enclosure.

In some cases, the radiation opaque material may be a layered material, for example, having a layer of a higher Z value material, to provide good shielding, and a layer of a lower Z value material to provide other properties (e.g., structural integrity, impact resistance, etc.). In some cases, the layered material may be a "graded-Z" laminate, e.g., including a laminate in which the layers provide a gradient from high-Z through successively lower-Z elements. In some cases the radiation opaque materials can be interlocking blocks, for example, lead and/or concrete blocks can be supplied by NELCO Worldwide (Burlington, Mass.), and reconfigurable vaults can be utilized.

A radiation opaque material can reduce the radiation passing through a structure (e.g., a wall, door, ceiling, enclosure, a series of these or combinations of these) formed of the material by about at least about 10%, (e.g., at least about 20%, at least about 30%, at least about 40%, at least about 50%, at least about 60%, at least about 70%, at least about 80%, at least about 90%, at least about 95%, at least about 96%, at least about 97%, at least about 98%, at least about 99%, at least about 99.9%, at least about 99.99%, at least about 99.999%) as compared to the incident radiation. Therefore, an enclosure made of a radiation opaque material can reduce the exposure of equipment/system/components by the same amount. Radiation opaque materials can include stainless steel, metals with Z values above 25 (e.g., lead, iron), concrete, dirt, sand and combinations thereof. Radiation opaque materials can include a barrier in the direction of the incident radiation of at least about 1 mm (e.g., 5 mm, 10 mm, 5 cm, 10 cm, 100 cm, 1 m and even at least 10 m).

Radiation Sources

The type of radiation determines the kinds of radiation sources used as well as the radiation devices and associated equipment. The methods, systems and equipment described herein, for example, for treating materials with radiation, can utilize sources as described herein as well as any other useful source.

Sources of gamma rays include radioactive nuclei, such as isotopes of cobalt, calcium, technetium, chromium, gallium, indium, iodine, iron, krypton, samarium, selenium, sodium, thallium, and xenon.

Sources of X-rays include electron beam collision with metal targets, such as tungsten or molybdenum or alloys, or compact light sources, such as those produced commercially by Lyncean.

Alpha particles are identical to the nucleus of a helium atom and are produced by the alpha decay of various radioactive nuclei, such as isotopes of bismuth, polonium, astatine, radon, francium, radium, several actinides, such as actinium, thorium, uranium, neptunium, curium, californium, americium, and plutonium.

Sources for ultraviolet radiation include deuterium or cadmium lamps.

Sources for infrared radiation include sapphire, zinc, or selenide window ceramic lamps.

Sources for microwaves include klystrons, Slevin type RF sources, or atom beam sources that employ hydrogen, oxygen, or nitrogen gases.

Accelerators used to accelerate the particles (e.g., electrons or ions) can be DC (e.g., electrostatic DC or electrodynamic DC), RF linear, magnetic induction linear or continuous wave. For example, various irradiating devices may be used in the methods disclosed herein, including field ionization sources, electrostatic ion separators, field ionization generators, thermionic emission sources, microwave discharge ion sources, recirculating or static accelerators, dynamic linear accelerators, van de Graaff accelerators, Cockroft Walton accelerators (e.g., PELLETRON® accelerators), LINACS, Dynamitrons (e.g., DYNAMITRON® accelerators), cyclotrons, synchrotrons, betatrons, transformer-type accelerators, microtrons, plasma generators, cascade accelerators, and folded tandem accelerators. For example, cyclotron type accelerators are available from IBA, Belgium, such as the RHODOTRON™ system, while DC type accelerators are available from RDI, now IBA Industrial, such as the DYNAMITRON®. Other suitable accelerator systems include, for example: DC insulated core transformer (ICT) type systems, available from Nissin High Voltage, Japan; S-band LINACs, available from L3-PSD (USA), Linac Systems (France), Mevex (Canada), and Mitsubishi Heavy Industries (Japan); L-band LINACs, available from Iotron Industries (Canada); and ILU-based accelerators, available from Budker Laboratories (Russia). Ions and ion accelerators are discussed in Introductory Nuclear Physics, Kenneth S. Krane, John Wiley & Sons, Inc. (1988), Krsto Prelec, FIZIKA B 6 (1997) 4, 177-206, Chu, William T., "Overview of Light-Ion Beam Therapy", Columbus-Ohio, ICRU-IAEA Meeting, 18-20 Mar. 2006, Iwata, Y. et al., "Alternating-Phase-Focused IH-DTL for Heavy-Ion Medical Accelerators", Proceedings of EPAC 2006, Edinburgh, Scotland, and Leitner, C M. et al., "Status of the Superconducting ECR Ion Source Venus", Proceedings of EPAC 2000, Vienna, Austria. Some particle accelerators and their uses are disclosed, for example, in U.S. Pat. No. 7,931,784 to Medoff, the complete disclosure of which is incorporated herein by reference.

Electrons may be produced by radioactive nuclei that undergo beta decay, such as isotopes of iodine, cesium, technetium, and iridium. Alternatively, an electron gun can be used as an electron source via thermionic emission and accelerated through an accelerating potential. An electron gun generates electrons, which are then accelerated through a large potential (e.g., greater than about 500 thousand, greater than about 1 million, greater than about 2 million, greater than about 5 million, greater than about 6 million, greater than about 7 million, greater than about 8 million, greater than about 9 million, or even greater than 10 million volts) and then scanned magnetically in the x-y plane, where the electrons are initially accelerated in the z direction down the accelerator tube and extracted through a foil window. Scanning the electron beams is useful for increasing the irradiation surface when irradiating materials, e.g., a biomass, that is conveyed through the scanned beam. Scanning the electron beam also distributes the thermal load homogenously on the window and helps reduce the foil window rupture due to local heating by the electron beam. Window foil rupture is a cause of significant down-time due to subsequent necessary repairs and re-starting the electron gun.

Various other irradiating devices may be used in the methods disclosed herein, including field ionization sources, electrostatic ion separators, field ionization generators, thermionic emission sources, microwave discharge ion sources, recirculating or static accelerators, dynamic linear accelerators, van de Graaff accelerators, and folded tandem accelerators. Such devices are disclosed, for example, in U.S. Pat. No. 7,931,784 to Medoff, the complete disclosure of which is incorporated herein by reference.

A beam of electrons can be used as the radiation source. A beam of electrons has the advantages of high dose rates (e.g., 1, 5, or even 10 Mrad per second), high throughput, less containment, and less confinement equipment. Electron beams can also have high electrical efficiency (e.g., 80%), allowing for lower energy usage relative to other radiation methods, which can translate into a lower cost of operation and lower greenhouse gas emissions corresponding to the smaller amount of energy used. Electron beams can be generated, e.g., by electrostatic generators, cascade generators, transformer generators, low energy accelerators with a scanning system, low energy accelerators with a linear cathode, linear accelerators, and pulsed accelerators.

Electrons can also be more efficient at causing changes in the molecular structure of carbohydrate-containing materials, for example, by the mechanism of chain scission. In addition, electrons having energies of 0.5-10 MeV can penetrate low density materials, such as the biomass materials described herein, e.g., materials having a bulk density of less than 0.5 g/cm$^3$, and a depth of 0.3-10 cm. Electrons as an ionizing radiation source can be useful, e.g., for relatively thin piles, layers or beds of materials, e.g., less than about 0.5 inch, e.g., less than about 0.4 inch, 0.3 inch, 0.25 inch, or less than about 0.1 inch. In some embodiments, the energy of each electron of the electron beam is from about 0.3 MeV to about 2.0 MeV (million electron volts), e.g., from about 0.5 MeV to about 1.5 MeV, or from about 0.7 MeV to about 1.25 MeV. Methods of irradiating materials are discussed in U.S. Pat. App. Pub. 2012/0100577 A1, filed Oct. 18, 2011, the entire disclosure of which is herein incorporated by reference.

Electron beam irradiation devices may be procured commercially or built. For example, elements or components such inductors, capacitors, casings, power sources, cables, wiring, voltage control systems, current control elements, insulating material, microcontrollers and cooling equipment can be purchased and assembled into a device. Optionally, a commercial device can be modified and/or adapted. For example, devices and components can be purchased from any of the commercial sources described herein including Ion Beam Applications (Louvain-la-Neuve, Belgium), Wasik Associates Inc. (Dracut, Mass.), NHV Corporation (Japan), the Titan Corporation (San Diego, Calif.), Vivirad High Voltage Corp (Billerica, Mass.) and/or Budker Laboratories (Russia). Typical electron energies can be 0.5 MeV, 1 MeV, 2 MeV, 4.5 MeV, 7.5 MeV, or 10 MeV. Typical electron beam irradiation device power can be 1 kW, 5 kW, 10 kW, 20 kW, 50 kW, 60 kW, 70 kW, 80 kW, 90 kW, 100 kW, 125 kW, 150 kW, 175 kW, 200 kW, 250 kW, 300 kW, 350 kW, 400 kW, 450 kW, 500 kW, 600 kW, 700 kW, 800 kW, 900 kW or even 1000 kW. Accelerators that can be used include NHV irradiators medium energy series EPS-500 (e.g., 500 kV accelerator voltage and 65, 100 or 150 mA beam current), EPS-800 (e.g., 800 kV accelerator voltage and 65 or 100 mA beam current), or EPS-1000 (e.g., 1000 kV accelerator voltage and 65 or 100 mA beam current). Also, accelerators from NHV's high energy series can be used such as EPS-1500 (e.g., 1500 kV accelerator voltage and 65 mA beam current), EPS-2000 (e.g., 2000 kV accelerator voltage and 50 mA beam current), EPS-3000 (e.g., 3000 kV accelerator voltage and 50 mA beam current) and EPS-5000 (e.g., 5000 and 30 mA beam current). Tradeoffs in considering electron beam irradiation device power specifications include cost to operate, capital costs, depreciation, and device footprint. Tradeoffs in considering exposure dose levels of electron beam irradiation would be energy costs and environment, safety, and health (ESH) concerns. Typically, generators are housed in a vault, e.g., of lead or concrete, especially for production from X-rays that are generated in the process. Tradeoffs in considering electron energies include energy costs.

The electron beam irradiation device can produce either a fixed beam or a scanning beam. A scanning beam may be advantageous with large scan sweep length and high scan speeds, as this would effectively replace a large, fixed beam width. Further, available sweep widths of 0.5 m, 1 m, 2 m or more are available. The scanning beam is preferred in most embodiments described herein because of the larger scan width and reduced possibility of local heating and failure of the windows.

Electron Guns—Windows

The extraction system for an electron accelerator can include two window foils. The cooling gas in the two foil window extraction system can be a purge gas or a mixture, for example, air, or a pure gas. In one embodiment, the gas is an inert gas such as nitrogen, argon, helium and/or carbon dioxide. It is preferred to use a gas rather than a liquid since energy losses to the electron beam are minimized. Mixtures of pure gas can also be used, either pre-mixed or mixed in line prior to impinging on the windows or in the space between the windows. The cooling gas can be cooled, for example, by using a heat exchange system (e.g., a chiller) and/or by using boil off from a condensed gas (e.g., liquid nitrogen, liquid helium). Window foils are described in PCT/US2013/64332 filed Oct. 10, 2013 the full disclosure of which is incorporated by reference herein.

Heating and Throughput During Radiation Treatment

Several processes can occur in biomass when electrons from an electron beam interact with matter in inelastic collisions. For example, ionization of the material, chain scission of polymers in the material, cross linking of polymers in the material, oxidation of the material, generation of X-rays ("Bremsstrahlung") and vibrational excitation of molecules (e.g., phonon generation). Without being bound to a particular mechanism, the reduction in recalcitrance can be due to several of these inelastic collision effects, for example, ionization, chain scission of polymers, oxidation and phonon generation. Some of the effects (e.g., especially X-ray generation), necessitate shielding and engineering barriers, for example, enclosing the irradiation processes in a concrete (or other radiation opaque material) vault. Another effect of irradiation, vibrational excitation, is equivalent to heating up the sample. Heating the sample by irradiation can help in recalcitrance reduction, but excessive heating can destroy the material, as will be explained below.

The adiabatic temperature rise ($\Delta T$) from adsorption of ionizing radiation is given by the equation: $\Delta T = D/C_p$: where D is the average dose in kGy, $C_p$ is the heat capacity in J/g $°$ C., and $\Delta T$ is the change in temperature in $°$ C. A typical dry biomass material will have a heat capacity close to 2. Wet biomass will have a higher heat capacity dependent on the amount of water since the heat capacity of water is very high (4.19 J/g $°$ C.). Metals have much lower heat capacities, for example, 304 stainless steel has a heat capacity of 0.5 J/g $°$ C. The temperature change due to the instant adsorption of radiation in a biomass and stainless steel for various doses of radiation is shown in Table 1. At the higher temperatures biomass will decompose causing extreme deviation from the estimated changes in temperature.

TABLE 1

Calculated Temperature increase for biomass and stainless steel.

| Dose (Mrad) | Estimated Biomass $\Delta T$ ($°$ C.) | Steel $\Delta T$ ($°$ C.) |
|---|---|---|
| 10 | 50 | 200 |
| 50 | 250 (decomposed) | 1000 |
| 100 | 500 (decomposed) | 2000 |
| 150 | 750 (decomposed) | 3000 |
| 200 | 1000 (decomposed) | 4000 |

High temperatures can destroy and/or modify the biopolymers in biomass so that the polymers (e.g., cellulose) are unsuitable for further processing. A biomass subjected to high temperatures can become dark, sticky and give off odors indicating decomposition. The stickiness can even make the material hard to convey. The odors can be unpleasant and be a safety issue. In fact, keeping the biomass below about 200$°$ C. has been found to be beneficial in the processes described herein (e.g., below about 190$°$ C., below about 180$°$ C., below about 170$°$ C., below about 160$°$ C., below about 150° C., below about 140° C., below about 130° C., below about 120° C., below about 110° C., between about 60° C. and 180° C., between about 60° C. and 160° C., between about 60° C. and 150° C., between about 60° C. and 140° C., between about 60° C. and 130° C., between about 60° C. and 120° C., between about 80° C. and 180° C., between about 100° C. and 180° C., between about 120° C. and 180° C., between about 140° C. and 180° C., between about 160° C. and 180° C., between about 100° C. and 140° C., between about 80° C. and 120° C.).

It has been found that irradiation above about 10 Mrad is desirable for the processes described herein (e.g., reduction of recalcitrance). A high throughput is also desirable so that the irradiation does not become a bottle neck in processing the biomass. The treatment is governed by a Dose rate equation: M=FP/Dtime, where M is the mass of irradiated material (kg), F is the fraction of power that is adsorbed (unit less), P is the emitted power (kW=Voltage in MeV×Current in mA), time is the treatment time (sec) and D is the adsorbed dose (kGy). In an exemplary process where the fraction of adsorbed power is fixed, the Power emitted is constant and a set dosage is desired, the throughput (e.g., M, the biomass processed) can be increased by increasing the irradiation time. However, increasing the irradiation time without allowing the material to cool, can excessively heat the material as exemplified by the calculations shown above. Since biomass has a low thermal conductivity (less than about 0.1 Wm$^{-1}$K$^{-1}$"), heat dissipation is slow, unlike, for example, metals (greater than about 10 Wm$^4$K$^4$) which can dissipate energy quickly as long as there is a heat sink to transfer the energy to.

Electron Guns—Beam Stops

In some embodiments the systems and methods include a beam stop (e.g., a shutter). For example, the beam stop can be used to quickly stop or reduce the irradiation of material without powering down the electron beam device. Alternatively the beam stop can be used while powering up the electron beam, e.g., the beam stop can stop the electron beam until a beam current of a desired level is achieved. The beam stop can be placed between the primary foil window and a secondary foil window. For example, the beam stop can be mounted so that it is movable, that is, so that it can be moved into and out of the beam path. Even partial coverage of the beam can be used, for example, to control the dose of irradiation. The beam stop can be mounted to the floor, to a conveyor for the biomass, to a wall, to the radiation device (e.g., at the scan horn), or to any structural support. Preferably the beam stop is fixed in relation to the scan horn so that the beam can be effectively controlled by the beam stop. The beam stop can incorporate a hinge, a rail, wheels, slots, or other means allowing for its operation in moving into and out of the beam. The beam stop can be made of any material that will stop at least 5% of the electrons, e.g., at least 10%, 20%, 30%, 40%, 50%, 60%, 70%, at least 80%, 85%, 90%, 91%, 92%, 93%, 94%, 95%, 96%, 97%, 98%, 99% or even about 100% of the electrons.

The beam stop can be made of a metal including, but not limited to, stainless steel, lead, iron, molybdenum, silver, gold, titanium, aluminum, tin, or alloys of these, or laminates (layered materials) made with such metals (e.g., metal-coated ceramic, metal-coated polymer, metal-coated composite, multilayered metal materials).

The beam stop can be cooled, for example, with a cooling fluid such as an aqueous solution or a gas. The beam stop can be partially or completely hollow, for example, with cavities. Interior spaces of the beam stop can be used for cooling fluids and gases. The beam stop can be of any shape, including flat, curved, round, oval, square, rectangular, beveled and wedged shapes.

The beam stop can have perforations so as to allow some electrons through, thus controlling (e.g., reducing) the levels of radiation across the whole area of the window, or in specific regions of the window. The beam stop can be a mesh formed, for example, from fibers or wires. Multiple beam stops can be used, together or independently, to control the irradiation. The beam stop can be remotely controlled, e.g., by radio signal or hard wired to a motor for moving the beam into or out of position.

Beam Dumps

The embodiments disclosed herein can also include a beam dump when utilizing a radiation treatment. A beam dump's purpose is to safely absorb a beam of charged particles. Like a beam stop, a beam dump can be used to block the beam of charged particles. However, a beam dump is much more robust than a beam stop, and is intended to block the full power of the electron beam for an extended period of time. They are often used to block the beam as the accelerator is powering up.

Beam dumps are also designed to accommodate the heat generated by such beams, and are usually made from materials such as copper, aluminum, carbon, beryllium, tungsten, or mercury. Beam dumps can be cooled, for example, using a cooling fluid that can be in thermal contact with the beam dump.

Biomass Materials

Lignocellulosic materials include, but are not limited to, wood, particle board, forestry wastes (e.g., sawdust, aspen wood, wood chips), grasses, (e.g., switchgrass, miscanthus, cord grass, reed canary grass), grain residues, (e.g., rice hulls, oat hulls, wheat chaff, barley hulls), agricultural waste (e.g., silage, canola straw, wheat straw, barley straw, oat straw, rice straw, jute, hemp, flax, bamboo, sisal, abaca, corn cobs, corn stover, soybean stover, corn fiber, alfalfa, hay, coconut hair), sugar processing residues (e.g., bagasse, beet pulp, agave bagasse), algae, seaweed, manure, sewage, and mixtures of any of these.

In some cases, the lignocellulosic material includes corncobs. Ground or hammermilled corncobs can be spread in a layer of relatively uniform thickness for irradiation, and after irradiation are easy to disperse in the medium for further processing. To facilitate harvest and collection, in some cases the entire corn plant is used, including the corn stalk, corn kernels, and in some cases even the root system of the plant.

Advantageously, no additional nutrients (other than a nitrogen source, e.g., urea or ammonia) are required during fermentation of corncobs or cellulosic or lignocellulosic materials containing significant amounts of corncobs.

Corncobs, before and after comminution, are also easier to convey and disperse, and have a lesser tendency to form explosive mixtures in air than other cellulosic or lignocellulosic materials such as hay and grasses.

Cellulosic materials include, for example, paper, paper products, paper waste, paper pulp, pigmented papers, loaded papers, coated papers, filled papers, magazines, printed matter (e.g., books, catalogs, manuals, labels, calendars, greeting cards, brochures, prospectuses, newsprint), printer paper, polycoated paper, card stock, cardboard, paperboard, materials having a high α-cellulose content such as cotton, and mixtures of any of these. For example, paper products as described in U.S. application Ser. No. 13/396,365 ("Magazine Feedstocks" by Medoff et al., filed Feb. 14, 2012), the full disclosure of which is incorporated herein by reference.

Cellulosic materials can also include lignocellulosic materials which have been partially or fully de-lignified.

In some instances other biomass materials can be utilized, for example, starchy materials. Starchy materials include starch itself, e.g., corn starch, wheat starch, potato starch or rice starch, a derivative of starch, or a material that includes starch, such as an edible food product or a crop. For example, the starchy material can be arracacha, buckwheat, banana, barley, cassava, kudzu, ocra, sago, sorghum, regular household potatoes, sweet potato, taro, yams, or one or more beans, such as favas, lentils or peas. Blends of any two or more starchy materials are also starchy materials. Mixtures of starchy, cellulosic and or lignocellulosic materials can also be used. For example, a biomass can be an entire plant, a part of a plant or different parts of a plant, e.g., a wheat plant, cotton plant, a corn plant, rice plant or a tree. The starchy materials can be treated by any of the methods described herein.

Microbial materials that can be used as feedstock can include, but are not limited to, any naturally occurring or genetically modified microorganism or organism that contains or is capable of providing a source of carbohydrates (e.g., cellulose), for example, protists, e.g., animal protists (e.g., protozoa such as flagellates, amoeboids, ciliates, and sporozoa) and plant protists (e.g., algae such alveolates, chlorarachniophytes, cryptomonads, euglenids, glaucophytes, haptophytes, red algae, stramenopiles, and viridaeplantae). Other examples include seaweed, plankton (e.g., macroplankton, mesoplankton, microplankton, nanoplankton, picoplankton, and femptoplankton), phytoplankton, bacteria (e.g., gram positive bacteria, gram negative bacteria, and extremophiles), yeast and/or mixtures of these. In some instances, microbial biomass can be obtained from natural sources, e.g., the ocean, lakes, bodies of water, e.g., salt water or fresh water, or on land. Alternatively or in addition, microbial biomass can be obtained from culture systems, e.g., large scale dry and wet culture and fermentation systems.

In other embodiments, the biomass materials, such as cellulosic, starchy and lignocellulosic feedstock materials, can be obtained from transgenic microorganisms and plants that have been modified with respect to a wild type variety. Such modifications may be, for example, through the iterative steps of selection and breeding to obtain desired traits in a plant. Furthermore, the plants can have had genetic material removed, modified, silenced and/or added with respect to the wild type variety. For example, genetically modified plants can be produced by recombinant DNA methods, where genetic modifications include introducing or modifying specific genes from parental varieties, or, for example, by using transgenic breeding wherein a specific gene or genes are introduced to a plant from a different species of plant and/or bacteria. Another way to create genetic variation is through mutation breeding wherein new alleles are artificially created from endogenous genes. The artificial genes can be created by a variety of ways including treating the plant or seeds with, for example, chemical mutagens (e.g., using alkylating agents, epoxides, alkaloids, peroxides, formaldehyde), irradiation (e.g., X-rays, gamma rays, neutrons, beta particles, alpha particles, protons, deuterons, UV radiation) and temperature shocking or other external stressing and subsequent selection techniques. Other methods of providing modified genes is through error prone PCR and DNA shuffling followed by insertion of the desired modified DNA into the desired plant or seed. Methods of introducing the desired genetic variation in the seed or plant include, for example, the use of a bacterial carrier, biolistics, calcium phosphate precipitation, electroporation, gene splicing, gene silencing, lipofection, microinjection and viral carriers. Additional genetically modified materials have been described in U.S. application Ser. No. 13/396,369 filed Feb. 14, 2012 the full disclosure of which is incorporated herein by reference.

Any of the methods described herein can be practiced with mixtures of any biomass materials described herein.

Other Materials

Other materials (e.g., natural or synthetic materials), for example, polymers, can be treated and/or made utilizing the methods, equipment and systems described herein. For example, polyethylene (e.g., linear low density ethylene and high density polyethylene), polystyrenes, sulfonated polystyrenes, poly(vinyl chloride), polyesters (e.g., nylons, DACRON™, KODEL™), polyalkylene esters, poly vinyl esters, polyamides (e.g., KEVLAR™), polyethylene terephthalate, cellulose acetate, acetal, poly acrylonitrile, polycarbonates (LEXAN™), acrylics [e.g., poly(methyl methacrylate), poly(methyl methacrylate), polyacrylonitrile], Poly urethanes, polypropylene, poly butadiene, polyisobutylene, polyacrylonitrile, polychloroprene (e.g. neoprene), poly(cis-1,4-isoprene) [e.g., natural rubber], poly (trans-1,4-isoprene) [e.g., gutta percha], phenol formaldehyde, melamine formaldehyde, epoxides, polyesters, poly amines, polycarboxylic acids, polylactic acids, polyvinyl alcohols, polyanhydrides, poly fluoro carbons (e.g., TEFLON™), silicons (e.g., silicone rubber), polysilanes, poly ethers (e.g., polyethylene oxide, polypropylene oxide), waxes, oils and mixtures of these. Also included are plastics, rubbers, elastomers, fibers, waxes, gels, oils, adhesives, thermoplastics, thermosets, biodegradable polymers, resins made with these polymers, other polymers, other materials and combinations thereof. The polymers can be made by any useful method including cationic polymerization, anionic polymerization, radical polymerization, metathesis polymerization, ring opening polymerization, graft polymerization, addition polymerization. In some cases the treatments disclosed herein can be used, for example, for radically initiated graft polymerization and cross linking. Composites of polymers, for example, with glass, metals, biomass (e.g., fibers, particles), ceramics can also be treated and/or made.

Other materials that can be treated by using the methods, systems and equipment disclosed herein are ceramic materials, minerals, metals, inorganic compounds. For example, silicon and germanium crystals, silicon nitrides, metal oxides, semiconductors, insulators, cements and or conductors.

In addition, manufactured multipart or shaped materials (e.g., molded, extruded, welded, riveted, layered or combined in any way) can be treated, for example, cables, pipes, boards, enclosures, integrated semiconductor chips, circuit boards, wires, tires, windows, laminated materials, gears, belts, machines, combinations of these. For example, treating a material by the methods described herein can modify the surfaces, for example, making them susceptible to further functionalization, combinations (e.g., welding) and/or treatment can cross link the materials.

Biomass Material Preparation—Mechanical Treatments

The biomass can be in a dry form, for example, with less than about 35% moisture content (e.g., less than about 20%, less than about 15%, less than about 10% less than about 5%, less than about 4%, less than about 3%, less than about 2% or even less than about 1%). The biomass can also be delivered in a wet state, for example, as a wet solid, a slurry or a suspension with at least about 10 wt. % solids (e.g., at least about 20 wt. %, at least about 30 wt. %, at least about 40 wt. %, at least about 50 wt. %, at least about 60 wt. %, at least about 70 wt. %).

The processes disclosed herein can utilize low bulk density materials, for example, cellulosic or lignocellulosic feedstocks that have been physically pretreated to have a bulk density of less than about 0.75 g/cm$^3$, e.g., less than about 0.7, 0.65, 0.60, 0.50, 0.35, 0.25, 0.20, 0.15, 0.10, 0.05 or less, e.g., less than about 0.025 g/cm$^3$. Bulk density is determined using ASTM D1895B. Briefly, the method involves filling a measuring cylinder of known volume with a sample and obtaining a weight of the sample. The bulk density is calculated by dividing the weight of the sample in grams by the known volume of the cylinder in cubic centimeters. If desired, low bulk density materials can be densified, for example, by methods described in U.S. Pat. No. 7,971,809 to Medoff, the full disclosure of which is hereby incorporated by reference.

In some cases, the pre-treatment processing includes screening of the biomass material. Screening can be through a mesh or perforated plate with a desired opening size, for example, less than about 6.35 mm (¼ inch, 0.25 inch), (e.g., less than about 3.18 mm (⅛ inch, 0.125 inch), less than about 1.59 mm (1/16 inch, 0.0625 inch), is less than about 0.79 mm (1/32 inch, 0.03125 inch), e.g., less than about 0.51 mm (1/50 inch, 0.02000 inch), less than about 0.40 mm (1/64 inch, 0.015625 inch), less than about 0.23 mm (0.009 inch), less than about 0.20 mm (1/128 inch, 0.0078125 inch), less than about 0.18 mm (0.007 inch), less than about 0.13 mm (0.005 inch), or even less than about 0.10 mm (1/256 inch, 0.00390625 inch)). In one configuration the desired biomass falls through the perforations or screen and thus biomass larger than the perforations or screen are not irradiated. These larger materials can be reprocessed, for example, by comminuting, or they can simply be removed from processing. In another configuration material that is larger than the perforations is irradiated and the smaller material is removed by the screening process or recycled. In this kind of a configuration, the conveyor itself (for example, a part of the conveyor) can be perforated or made with a mesh. For example, in one particular embodiment the biomass material may be wet and the perforations or mesh allow water to drain away from the biomass before irradiation.

Screening of material can also be by a manual method, for example, by an operator or mechanoid (e.g., a robot equipped with a color, reflectivity or other sensor) that removes unwanted material. Screening can also be by magnetic screening wherein a magnet is disposed near the conveyed material and the magnetic material is removed magnetically.

Optional pre-treatment processing can include heating the material. For example, a portion of a conveyor conveying the biomass or other material can be sent through a heated zone. The heated zone can be created, for example, by IR radiation, microwaves, combustion (e.g., gas, coal, oil, biomass), resistive heating and/or inductive coils. The heat can be applied from at least one side or more than one side, can be continuous or periodic and can be for only a portion of the material or all the material. For example, a portion of the conveying trough can be heated by use of a heating jacket. Heating can be, for example, for the purpose of drying the material. In the case of drying the material, this can also be facilitated, with or without heating, by the movement of a gas (e.g., air, oxygen, nitrogen, He, $CO_2$, Argon) over and/or through the biomass as it is being conveyed.

Optionally, pre-treatment processing can include cooling the material. Cooling material is described in U.S. Pat. No. 7,900,857 to Medoff, the disclosure of which in incorporated herein by reference. For example, cooling can be by supplying a cooling fluid, for example, water (e.g., with glycerol), or nitrogen (e.g., liquid nitrogen) to the bottom of the conveying trough. Alternatively, a cooling gas, for example, chilled nitrogen can be blown over the biomass materials or under the conveying system.

Another optional pre-treatment processing method can include adding a material to the biomass or other feedstocks. The additional material can be added by, for example, by showering, sprinkling and or pouring the material onto the biomass as it is conveyed. Materials that can be added include, for example, metals, ceramics and/or ions as described in U.S. Pat. App. Pub. 2010/0105119 A1 (filed Oct. 26, 2009) and U.S. Pat. App. Pub. 2010/0159569 A1 (filed Dec. 16, 2009), the entire disclosures of which are incorporated herein by reference. Optional materials that can be added include acids and bases. Other materials that can be added are oxidants (e.g., peroxides, chlorates), polymers, polymerizable monomers (e.g., containing unsaturated bonds), water, catalysts, enzymes and/or organisms. Materials can be added, for example, in pure form, as a solution in a solvent (e.g., water or an organic solvent) and/or as a solution. In some cases the solvent is volatile and can be made to evaporate e.g., by heating and/or blowing gas as previously described. The added material may form a uniform coating on the biomass or be a homogeneous mixture of different components (e.g., biomass and additional material). The added material can modulate the subsequent irradiation step by increasing the efficiency of the irradiation, damping the irradiation or changing the effect of the irradiation (e.g., from electron beams to X-rays or heat). The method may have no impact on the irradiation but may be useful for further downstream processing. The added material may help in conveying the material, for example, by lowering dust levels.

Biomass can be delivered to a conveyor (e.g., vibratory conveyors that can be used in the vaults herein described) by a belt conveyor, a pneumatic conveyor, a screw conveyor, a hopper, a pipe, manually or by a combination of these. The biomass can, for example, be dropped, poured and/or placed onto the conveyor by any of these methods. In some embodiments the material is delivered to the conveyor using an enclosed material distribution system to help maintain a low oxygen atmosphere and/or control dust and fines. Lofted or air suspended biomass fines and dust are undesirable because these can form an explosion hazard or damage the window foils of an electron gun (if such a device is used for treating the material).

The material can be leveled to form a uniform thickness between about 0.0312 and 5 inches (e.g., between about 0.0625 and 2.000 inches, between about 0.125 and 1 inches, between about 0.125 and 0.5 inches, between about 0.3 and 0.9 inches, between about 0.2 and 0.5 inches between about 0.25 and 1.0 inches, between about 0.25 and 0.5 inches, 0.100+/−0.025 inches, 0.150+/−0.025 inches, 0.200+/−0.025 inches, 0.250+/−0.025 inches, 0.300+/−0.025 inches, 0.350+/−0.025 inches, 0.400+/−0.025 inches, 0.450+/−0.025 inches, 0.500+/−0.025 inches, 0.550+/−0.025 inches, 0.600+/−0.025 inches, 0.700+/−0.025 inches, 0.750+/−0.025 inches, 0.800+/−0.025 inches, 0.850+/−0.025 inches, 0.900+/−0.025 inches, 0.900+/−0.025 inches.

Generally, it is preferred to convey the material as quickly as possible through the electron beam to maximize throughput. For example, the material can be conveyed at rates of at least 1 ft/min, e.g., at least 2 ft/min, at least 3 ft/min, at least 4 ft/min, at least 5 ft/min, at least 10 ft/min, at least 15 ft/min, 20, 25, 30, 35, 40, 45, 50 ft/min. The rate of conveying is related to the beam current, for example, for a ¼ inch thick biomass and 100 mA, the conveyor can move at about 20 ft/min to provide a useful irradiation dosage, at 50 mA the conveyor can move at about 10 ft/min to provide approximately the same irradiation dosage.

After the biomass material has been conveyed through the radiation zone, optional post-treatment processing can be done. The optional post-treatment processing can, for example, be a process described with respect to the pre-irradiation processing. For example, the biomass can be screened, heated, cooled, and/or combined with additives. Uniquely to post-irradiation, quenching of the radicals can occur, for example, by the addition of fluids or gases (e.g., oxygen, nitrous oxide, ammonia and/or liquids), using pressure, heat, and/or the addition of radical scavengers. For example, the biomass can be conveyed out of the enclosed conveyor and exposed to a gas (e.g., oxygen) where it is quenched, forming carboxylated groups. In one embodiment, the biomass is exposed during irradiation to the reactive gas or fluid. Quenching of biomass that has been irradiated is described in U.S. Pat. No. 8,083,906 to Medoff, the entire disclosure of which is incorporate herein by reference.

If desired, one or more mechanical treatments can be used in addition to irradiation to further reduce the recalcitrance of the carbohydrate-containing material. These processes can be applied before, during and/or after irradiation.

In some cases, the mechanical treatment may include an initial preparation of the feedstock as received, e.g., size reduction of materials, such as by comminution, e.g., cutting, grinding, shearing, pulverizing or chopping. For example, in some cases, loose feedstock (e.g., recycled paper, starchy materials, or switchgrass) is prepared by shearing or shredding. Mechanical treatment may reduce the bulk density of the carbohydrate-containing material, increase the surface area of the carbohydrate-containing material and/or decrease one or more dimensions of the carbohydrate-containing material.

Alternatively, or in addition, the feedstock material can be treated with another treatment, for example, chemical treatments, such as an acid (HCl, $H_2SO_4$, $H_3PO_4$), a base (e.g., KOH and NaOH), a chemical oxidant (e.g., peroxides, chlorates, ozone), irradiation, steam explosion, pyrolysis, sonication, oxidation, chemical treatment. The treatments can be in any order and in any sequence and combinations. For example, the feedstock material can first be physically treated by one or more treatment methods, e.g., chemical treatment including and in combination with acid hydrolysis (e.g., utilizing HCl, $H_2SO_4$, $H_3PO_4$), radiation, sonication, oxidation, pyrolysis or steam explosion, and then mechanically treated. This sequence can be advantageous since materials treated by one or more of the other treatments, e.g., irradiation or pyrolysis, tend to be more brittle and, therefore, it may be easier to further change the structure of the material by mechanical treatment. As another example, a feedstock material can be conveyed through ionizing radiation using a conveyor as described herein and then mechanically treated. Chemical treatment can remove some or all of the lignin (for example, chemical pulping) and can partially or completely hydrolyze the material. The methods also can be used with pre-hydrolyzed material. The methods also can be used with material that has not been pre-hydrolyzed. The methods can be used with mixtures of hydrolyzed and non-hydrolyzed materials, for example, with about 50% or more non-hydrolyzed material, with about 60% or more non-hydrolyzed material, with about 70% or more non-hydrolyzed material, with about 80% or more non-hydrolyzed material or even with 90% or more non-hydrolyzed material.

In addition to size reduction, which can be performed initially and/or later in processing, mechanical treatment can also be advantageous for "opening up," "stressing," breaking or shattering the carbohydrate-containing materials, making the cellulose of the materials more susceptible to chain scission and/or disruption of crystalline structure during the physical treatment.

Methods of mechanically treating the carbohydrate-containing material include, for example, milling or grinding. Milling may be performed using, for example, a hammer mill, ball mill, colloid mill, conical or cone mill, disk mill, edge mill, Wiley mill, grist mill or other mill. Grinding may be performed using, for example, a cutting/impact type grinder. Some exemplary grinders include stone grinders, pin grinders, coffee grinders, and burr grinders. Grinding or milling may be provided, for example, by a reciprocating pin or other element, as is the case in a pin mill. Other mechanical treatment methods include mechanical ripping or tearing, other methods that apply pressure to the fibers, and air attrition milling. Suitable mechanical treatments further include any other technique that continues the disruption of the internal structure of the material that was initiated by the previous processing steps.

Mechanical feed preparation systems can be configured to produce streams with specific characteristics such as, for example, specific maximum sizes, specific length-to-width, or specific surface areas ratios. Physical preparation can increase the rate of reactions, improve the movement of material on a conveyor, improve the irradiation profile of the material, improve the radiation uniformity of the material, or reduce the processing time required by opening up the materials and making them more accessible to processes and/or reagents, such as reagents in a solution.

The bulk density of feedstocks can be controlled (e.g., increased). In some situations, it can be desirable to prepare a low bulk density material, e.g., by densifying the material (e.g., densification can make it easier and less costly to transport to another site) and then reverting the material to a lower bulk density state (e.g., after transport). The material can be densified, for example, from less than about 0.2 g/cc to more than about 0.9 g/cc (e.g., less than about 0.3 to more than about 0.5 g/cc, less than about 0.3 to more than about 0.9 g/cc, less than about 0.5 to more than about 0.9 g/cc, less than about 0.3 to more than about 0.8 g/cc, less than about 0.2 to more than about 0.5 g/cc). For example, the material can be densified by the methods and equipment disclosed in U.S. Pat. No. 7,932,065 to Medoff and International Publication No. WO 2008/073186 (which was filed Oct. 26, 2007, was published in English, and which designated the United States), the full disclosures of which are incorporated herein by reference. Densified materials can be processed by any of the methods described herein, or any material processed by any of the methods described herein can be subsequently densified.

In some embodiments, the material to be processed is in the form of a fibrous material that includes fibers provided by shearing a fiber source. For example, the shearing can be performed with a rotary knife cutter.

For example, a fiber source, e.g., that is recalcitrant or that has had its recalcitrance level reduced, can be sheared, e.g., in a rotary knife cutter, to provide a first fibrous material. The first fibrous material is passed through a first screen, e.g., having an average opening size of 1.59 mm or less (1/16 inch, 0.0625 inch), provide a second fibrous material. If desired, the fiber source can be cut prior to the shearing, e.g., with a shredder. For example, when a paper is used as the fiber source, the paper can be first cut into strips that are, e.g., ¼- to ½-inch wide, using a shredder, e.g., a counter-rotating screw shredder, such as those manufactured by Munson (Utica, N.Y.). As an alternative to shredding, the paper can be reduced in size by cutting to a desired size using a guillotine cutter. For example, the guillotine cutter can be used to cut the paper into sheets that are, e.g., 10 inches wide by 12 inches long.

In some embodiments, the shearing of the fiber source and the passing of the resulting first fibrous material through a first screen are performed concurrently. The shearing and the passing can also be performed in a batch-type process.

For example, a rotary knife cutter can be used to concurrently shear the fiber source and screen the first fibrous material. A rotary knife cutter includes a hopper that can be loaded with a shredded fiber source prepared by shredding a fiber source.

In some implementations, the feedstock is physically treated prior to saccharification and/or fermentation. Physical treatment processes can include one or more of any of those described herein, such as mechanical treatment, chemical treatment, irradiation, sonication, oxidation, pyrolysis or steam explosion. Treatment methods can be used in combinations of two, three, four, or even all of these technologies (in any order). When more than one treatment method is used, the methods can be applied at the same time or at different times. Other processes that change a molecular structure of a biomass feedstock may also be used, alone or in combination with the processes disclosed herein.

Mechanical treatments that may be used, and the characteristics of the mechanically treated carbohydrate-containing materials, are described in further detail in U.S. Pat. App. Pub. 2012/0100577 A1, filed Oct. 18, 2011, the full disclosure of which is hereby incorporated herein by reference.

Sonication, Pyrolysis, Oxidation, Steam Explosion

If desired, one or more sonication, pyrolysis, oxidative, or steam explosion processes can be used, instead of or in addition to, irradiation to reduce or further reduce the recalcitrance of the carbohydrate-containing material. For example, these processes can be applied before, during and/or after irradiation. These processes are described in detail in U.S. Pat. No. 7,932,065 to Medoff, the full disclosure of which is incorporated herein by reference Intermediates and Products Using the processes described herein, the biomass material can be converted to one or more products, such as energy, fuels, foods and materials. For example, intermediates and products such as organic acids, salts of organic acids, anhydrides, esters of organic acids and fuels, e.g., fuels for internal combustion engines or feedstocks for fuel cells. Systems and processes are described herein that can use as feedstock cellulosic and/or lignocellulosic materials that are readily available, but often can be difficult to process, e.g., municipal waste streams and waste paper streams, such as streams that include newspaper, Kraft paper, corrugated paper or mixtures of these.

Specific examples of products include, but are not limited to, hydrogen, sugars (e.g., glucose, xylose, arabinose, mannose, galactose, fructose, disaccharides, oligosaccharides and polysaccharides), alcohols (e.g., monohydric alcohols or dihydric alcohols, such as ethanol, n-propanol, isobutanol, sec-butanol, tert-butanol or n-butanol), hydrated or hydrous alcohols (e.g., containing greater than 10%, 20%, 30% or even greater than 40% water), biodiesel, organic acids, hydrocarbons (e.g., methane, ethane, propane, isobutene, pentane, n-hexane, biodiesel, bio-gasoline and mixtures thereof), co-products (e.g., proteins, such as cellulolytic proteins (enzymes) or single cell proteins), and mixtures of any of these in any combination or relative concentration, and optionally, in combination with any additives (e.g., fuel additives). Other examples include carboxylic acids, salts of a carboxylic acid, a mixture of carboxylic acids and salts of carboxylic acids and esters of carboxylic acids (e.g., methyl, ethyl and n-propyl esters), ketones (e.g., acetone), aldehydes (e.g., acetaldehyde), alpha and beta unsaturated acids (e.g., acrylic acid) and olefins (e.g., ethylene). Other alcohols and alcohol derivatives include propanol, propylene glycol, 1,4-butanediol, 1,3-propanediol, sugar alcohols (e.g., erythritol, glycol, glycerol, sorbitol threitol, arabitol, ribitol, mannitol, dulcitol, fucitol, iditol, isomalt, maltitol, lactitol, xylitol and other polyols), and methyl or ethyl esters of any of these alcohols. Other products include methyl acrylate, methylmethacrylate, lactic acid, citric acid, formic acid, acetic acid, propionic acid, butyric acid, succinic acid, valeric acid, caproic acid, 3-hydroxypropionic acid, palmitic acid, stearic acid, oxalic acid, malonic acid, glutaric acid, oleic acid, linoleic acid, glycolic acid, gamma-hydroxybutyric acid, and mixtures thereof, salts of any of these acids, mixtures of any of the acids and their respective salts.

Any combination of the above products with each other, and/or of the above products with other products, which other products may be made by the processes described herein or otherwise, may be packaged together and sold as products. The products may be combined, e.g., mixed, blended or co-dissolved, or may simply be packaged or sold together.

Any of the products or combinations of products described herein may be sanitized or sterilized prior to selling the products, e.g., after purification or isolation or even after packaging, to neutralize one or more potentially undesirable contaminants that could be present in the product(s). Such sanitation can be done with electron bombardment, for example, be at a dosage of less than about 20 Mrad, e.g., from about 0.1 to 15 Mrad, from about 0.5 to 7 Mrad, or from about 1 to 3 Mrad.

The processes described herein can produce various by-product streams useful for generating steam and electricity to be used in other parts of the plant (co-generation) or sold on the open market. For example, steam generated from burning by-product streams can be used in a distillation process. As another example, electricity generated from burning by-product streams can be used to power electron beam generators used in pretreatment.

The by-products used to generate steam and electricity are derived from a number of sources throughout the process.

For example, anaerobic digestion of wastewater can produce a biogas high in methane and a small amount of waste biomass (sludge). As another example, post-saccharification and/or post-distillate solids (e.g., unconverted lignin, cellulose, and hemicellulose remaining from the pretreatment and primary processes) can be used, e.g., burned, as a fuel.

Other intermediates and products, including food and pharmaceutical products, are described in U.S. Pat. App. Pub. 2010/0124583 A1, published May 20, 2010, to Medoff, the full disclosure of which is hereby incorporated by reference herein.

Lignin Derived Products

The spent biomass (e.g., spent lignocellulosic material) from lignocellulosic processing by the methods described are expected to have a high lignin content and in addition to being useful for producing energy through combustion in a Co-Generation plant, may have uses as other valuable products. For example, the lignin can be used as captured as a plastic, or it can be synthetically upgraded to other plastics. In some instances, it can also be converted to lignosulfonates, which can be utilized as binders, dispersants, emulsifiers or sequestrants.

When used as a binder, the lignin or a lignosulfonate can, e.g., be utilized in coal briquettes, in ceramics, for binding carbon black, for binding fertilizers and herbicides, as a dust suppressant, in the making of plywood and particle board, for binding animal feeds, as a binder for fiberglass, as a binder in linoleum paste and as a soil stabilizer.

When used as a dispersant, the lignin or lignosulfonates can be used, for example in, concrete mixes, clay and ceramics, dyes and pigments, leather tanning and in gypsum board.

When used as an emulsifier, the lignin or lignosulfonates can be used, e.g., in asphalt, pigments and dyes, pesticides and wax emulsions.

As a sequestrant, the lignin or lignosulfonates can be used, e.g., in micro-nutrient systems, cleaning compounds and water treatment systems, e.g., for boiler and cooling systems.

For energy production lignin generally has a higher energy content than holocellulose (cellulose and hemicellulose) since it contains more carbon than homocellulose. For example, dry lignin can have an energy content of between about 11,000 and 12,500 BTU per pound, compared to 7,000 an 8,000 BTU per pound of holocellulose. As such, lignin can be densified and converted into briquettes and pellets for burning. For example, the lignin can be converted into pellets by any method described herein. For a slower burning pellet or briquette, the lignin can be crosslinked, such as applying a radiation dose of between about 0.5 Mrad and 5 Mrad. Crosslinking can make a slower burning form factor. The form factor, such as a pellet or briquette, can be converted to a "synthetic coal" or charcoal by pyrolyzing in the absence of air, e.g., at between 400 and 950° C. Prior to pyrolyzing, it can be desirable to crosslink the lignin to maintain structural integrity.

Saccharification

In order to convert the feedstock to a form that can be readily processed, the glucan- or xylan-containing cellulose in the feedstock can be hydrolyzed to low molecular weight carbohydrates, such as sugars, by a saccharifying agent, e.g., an enzyme or acid, a process referred to as saccharification. The low molecular weight carbohydrates can then be used, for example, in an existing manufacturing plant, such as a single cell protein plant, an enzyme manufacturing plant, or a fuel plant, e.g., an ethanol manufacturing facility.

The feedstock can be hydrolyzed using an enzyme, e.g., by combining the materials and the enzyme in a solvent, e.g., in an aqueous solution.

Alternatively, the enzymes can be supplied by organisms that break down biomass, such as the cellulose and/or the lignin portions of the biomass, contain or manufacture various cellulolytic enzymes (cellulases), ligninases or various small molecule biomass-degrading metabolites. These enzymes may be a complex of enzymes that act synergistically to degrade crystalline cellulose or the lignin portions of biomass. Examples of cellulolytic enzymes include: endoglucanases, cellobiohydrolases, and cellobiases (beta-glucosidases).

During saccharification, a cellulosic substrate can be initially hydrolyzed by endoglucanases at random locations producing oligomeric intermediates. These intermediates are then substrates for exo-splitting glucanases such as cellobiohydrolase to produce cellobiose from the ends of the cellulose polymer. Cellobiose is a water-soluble 1,4-linked dimer of glucose. Finally, cellobiase cleaves cellobiose to yield glucose. The efficiency (e.g., time to hydrolyze and/or completeness of hydrolysis) of this process depends on the recalcitrance of the cellulosic material.

Therefore, the treated biomass materials can be saccharified, generally by combining the material and a cellulase enzyme in a fluid medium, e.g., an aqueous solution. In some cases, the material is boiled, steeped, or cooked in hot water prior to saccharification, as described in U.S. Pat. App. Pub. 2012/0100577 A1 by Medoff and Masterman, published on Apr. 26, 2012, the entire contents of which are incorporated herein.

The saccharification process can be partially or completely performed in a tank (e.g., a tank having a volume of at least 4000, 40,000, or 500,000 L) in a manufacturing plant, and/or can be partially or completely performed in transit, e.g., in a rail car, tanker truck, or in a supertanker or the hold of a ship. The time required for complete saccharification will depend on the process conditions and the carbohydrate-containing material and enzyme used. If saccharification is performed in a manufacturing plant under controlled conditions, the cellulose may be substantially entirely converted to sugar, e.g., glucose in about 12-96 hours. If saccharification is performed partially or completely in transit, saccharification may take longer.

It is generally preferred that the tank contents be mixed during saccharification, e.g., using jet mixing as described in International App. No. PCT/US2010/035331, filed May 18, 2010, which was published in English as WO 2010/135380 and designated the United States, the full disclosure of which is incorporated by reference herein.

The addition of surfactants can enhance the rate of saccharification. Examples of surfactants include non-ionic surfactants, such as a Tween® 20 or Tween® 80 polyethylene glycol surfactants, ionic surfactants, or amphoteric surfactants.

It is generally preferred that the concentration of the sugar solution resulting from saccharification be relatively high, e.g., greater than 40%, or greater than 50, 60, 70, 80, 90 or even greater than 95% by weight. Water may be removed, e.g., by evaporation, to increase the concentration of the sugar solution. This reduces the volume to be shipped, and also inhibits microbial growth in the solution.

Alternatively, sugar solutions of lower concentrations may be used, in which case it may be desirable to add an antimicrobial additive, e.g., a broad spectrum antibiotic, in a low concentration, e.g., 50 to 150 ppm. Other suitable antibiotics include amphotericin B, ampicillin, chloramphenicol, ciprofloxacin, gentamicin, hygromycin B, kanamycin, neomycin, penicillin, puromycin, streptomycin. Antibiotics will inhibit growth of microorganisms during transport and storage, and can be used at appropriate concentrations, e.g., between 15 and 1000 ppm by weight, e.g., between 25 and 500 ppm, or between 50 and 150 ppm. If desired, an antibiotic can be included even if the sugar concentration is relatively high. Alternatively, other additives with anti-microbial preservative properties may be used. Preferably the antimicrobial additive(s) are food-grade.

A relatively high concentration solution can be obtained by limiting the amount of water added to the carbohydrate-containing material with the enzyme. The concentration can be controlled, e.g., by controlling how much saccharification takes place. For example, concentration can be increased by adding more carbohydrate-containing material to the solution. In order to keep the sugar that is being produced in solution, a surfactant can be added, e.g., one of those discussed above. Solubility can also be increased by increasing the temperature of the solution. For example, the solution can be maintained at a temperature of 40-50° C., 60-80° C., or even higher.

Saccharifying Agents

Suitable cellulolytic enzymes include cellulases from species in the genera *Bacillus, Coprinus, Myceliophthora, Cephalosporium, Scytalidium, Penicillium, Aspergillus, Pseudomonas, Humicola, Fusarium, Thielavia, Acremonium, Chrysosporium* and *Trichoderma*, especially those produced by a strain selected from the species *Aspergillus* (see, e.g., EP Pub. No. 0 458 162), *Humicola insolens* (reclassified as *Scytalidium thermophilum*, see, e.g., U.S. Pat. No. 4,435,307), *Coprinus cinereus, Fusarium oxysporum, Myceliophthora thermophila, Meripilus giganteus, Thielavia terrestris, Acremonium* sp. (including, but not limited to, *A. persicinum, A. acremonium, A. brachypenium, A. dichromosporum, A. obclavatum, A. pinkertoniae, A. roseogriseum, A. incoloratum,* and *A. furatum*). Preferred strains include *Humicola insolens* DSM 1800, *Fusarium oxysporum* DSM 2672, *Myceliophthora thermophila* CBS 117.65, *Cephalosporium* sp. RYM-202, *Acremonium* sp. CBS 478.94, *Acremonium* sp. CBS 265.95, *Acremonium persicinum* CBS 169.65, *Acremonium acremonium* AHU 9519, *Cephalosporium* sp. CBS 535.71, *Acremonium brachypenium* CBS 866.73, *Acremonium dichromosporum* CBS 683.73, *Acremonium obclavatum* CBS 311.74, *Acremonium pinkertoniae* CBS 157.70, *Acremonium roseogriseum* CBS 134.56, *Acremonium incoloratum* CBS 146.62, and *Acremonium furatum* CBS 299.70H. Cellulolytic enzymes may also be obtained from *Chrysosporium*, preferably a strain of *Chrysosporium lucknowense*. Additional strains that can be used include, but are not limited to, *Trichoderma* (particularly *T. viride, T. reesei,* and *T. koningii*), alkalophilic *Bacillus* (see, for example, U.S. Pat. No. 3,844,890 and EP Pub. No. 0 458 162), and *Streptomyces* (see, e.g., EP Pub. No. 0 458 162).

In addition to or in combination to enzymes, acids, bases and other chemicals (e.g., oxidants) can be utilized to saccharify lignocellulosic and cellulosic materials. These can be used in any combination or sequence (e.g., before, after and/or during addition of an enzyme). For example, strong mineral acids can be utilized (e.g. HCl, $H_2SO_4$, $H_3PO_4$) and strong bases (e.g., NaOH, KOH).

Sugars

In the processes described herein, for example, after saccharification, sugars (e.g., glucose and xylose) can be isolated. For example, sugars can be isolated by precipitation, crystallization, chromatography (e.g., simulated moving bed chromatography, high pressure chromatography), centrifugation, extraction, any other isolation method known in the art, and combinations thereof.

Hydrogenation and Other Chemical Transformations

The processes described herein can include hydrogenation. For example, glucose and xylose can be hydrogenated to sorbitol and xylitol, respectively. Hydrogenation can be accomplished by use of a catalyst (e.g., Pt/gamma-$Al_2O_3$, Ru/C, Raney Nickel, or other catalysts known in the art) in combination with $H_2$ under high pressure (e.g., 10 to 12000 psi). Other types of chemical transformation of the products from the processes described herein can be used, for example, production of organic sugar derived products (e.g., furfural and furfural-derived products). Chemical transformations of sugar derived products are described in U.S. Ser. No. 13/934,704 filed Jul. 3, 2013, the entire disclosure of which is incorporated herein by reference.

Fermentation

Yeast and *Zymomonas* bacteria, for example, can be used for fermentation or conversion of sugar(s) to alcohol(s). Other microorganisms are discussed below. The optimum pH for fermentations is about pH 4 to 7. For example, the optimum pH for yeast is from about pH 4 to 5, while the optimum pH for *Zymomonas* is from about pH 5 to 6. Typical fermentation times are about 24 to 168 hours (e.g., 24 to 96 hrs) with temperatures in the range of 20° C. to 40° C. (e.g., 26° C. to 40° C.); however thermophilic microorganisms prefer higher temperatures.

In some embodiments, e.g., when anaerobic organisms are used, at least a portion of the fermentation is conducted in the absence of oxygen, e.g., under a blanket of an inert gas such as $N_2$, Ar, He, $CO_2$ or mixtures thereof. Additionally, the mixture may have a constant purge of an inert gas flowing through the tank during part of or all of the fermentation. In some cases, anaerobic conditions can be achieved or maintained by carbon dioxide production during the fermentation and no additional inert gas is needed.

In some embodiments, all or a portion of the fermentation process can be interrupted before the low molecular weight sugar is completely converted to a product (e.g., ethanol). The intermediate fermentation products include sugar and carbohydrates in high concentrations. The sugars and carbohydrates can be isolated via any means known in the art. These intermediate fermentation products can be used in preparation of food for human or animal consumption. Additionally or alternatively, the intermediate fermentation products can be ground to a fine particle size in a stainless-steel laboratory mill to produce a flour-like substance. Jet mixing may be used during fermentation, and in some cases saccharification and fermentation are performed in the same tank.

Nutrients for the microorganisms may be added during saccharification and/or fermentation, for example, the food-based nutrient packages described in U.S. Pat. App. Pub. 2012/0052536, filed Jul. 15, 2011, the complete disclosure of which is incorporated herein by reference.

"Fermentation" includes the methods and products that are disclosed in application Nos. PCT/US2012/71093 published Jun. 27, 2013, PCT/US2012/71907 published Jun. 27, 2012, and PCT/US2012/71083 published Jun. 27, 2012 the contents of which are incorporated by reference herein in their entirety.

Mobile fermenters can be utilized, as described in International App. No. PCT/US2007/074028 (which was filed Jul. 20, 2007, was published in English as WO 2008/011598 and designated the United States) and has a US issued U.S. Pat. No. 8,318,453, the contents of which are incorporated herein in its entirety. Similarly, the saccharification equipment can be mobile. Further, saccharification and/or fermentation may be performed in part or entirely during transit.

Fermentation Agents

The microorganism(s) used in fermentation can be naturally-occurring microorganisms and/or engineered microorganisms. For example, the microorganism can be a bacterium (including, but not limited to, e.g., a cellulolytic bacterium), a fungus, (including, but not limited to, e.g., a yeast), a plant, a protist, e.g., a protozoa or a fungus-like protest (including, but not limited to, e.g., a slime mold), or an alga. When the organisms are compatible, mixtures of organisms can be utilized.

Suitable fermenting microorganisms have the ability to convert carbohydrates, such as glucose, fructose, xylose, arabinose, mannose, galactose, oligosaccharides or polysaccharides into fermentation products. Fermenting microorganisms include strains of the genus *Saccharomyces* spp. (including, but not limited to, *S. cerevisiae* (baker's yeast), *S. distaticus, S. uvarum*), the genus *Kluyveromyces*, (including, but not limited to, *K. marxianus, K. fragilis*), the genus *Candida* (including, but not limited to, *C. pseudotropicalis*, and *C. brassicae*), *Pichia stipitis* (a relative of *Candida shehatae*), the genus *Clavispora* (including, but not limited to, *C. lusitaniae* and *C. opuntiae*), the genus *Pachysolen* (including, but not limited to, *P. tannophilus*), the genus *Bretannomyces* (including, but not limited to, e.g., *B. clausenii* (Philippidis, G. P., 1996, Cellulose Bioconversion Technology, in Handbook on Bioethanol: Production and Utilization, Wyman, C. E., ed., Taylor & Francis, Washington, D.C., 179-212)). Other suitable microorganisms include, for example, *Zymomonas mobilis, Clostridium* spp. (including, but not limited to, *C. thermocellum* (Philippidis, 1996, supra), *C. saccharobutylacetonicum, C. tyrobutyricum C. saccharobutylicum, C. Puniceum, C. beijernckii*, and *C. acetobutylicum*), *Moniliella* spp. (including but not limited to *M. pollinis, M. tomentosa, M. madida, M. nigrescens, M. oedocephali, M. megachiliensis*), *Yarrowia lipolytica, Aureobasidium* sp., *Trichosporonoides* sp., *Trigonopsis variabilis, Trichosporon* sp., *Moniliellaacetoabutans* sp., *Typhula variabilis, Candida magnoliae, Ustilaginomycetes* sp., *Pseudozyma tsukubaensis*, yeast species of genera *Zygosaccharomyces, Debaryomyces, Hansenula* and *Pichia*, and fungi of the dematioid genus *Torula* (e.g., *T. corallina*).

Many such microbial strains are publicly available, either commercially or through depositories such as the ATCC (American Type Culture Collection, Manassas, Va., USA), the NRRL (Agricultural Research Service Culture Collection, Peoria, Ill., USA), or the DSMZ (Deutsche Sammlung von Mikroorganismen and Zellkulturen GmbH, Braunschweig, Germany), to name a few.

Commercially available yeasts include, for example, RED STAR®/Lesaffre Ethanol Red (available from Red Star/Lesaffre, USA), FALI® (available from Fleischmann's Yeast, a division of Burns Philip Food Inc., USA), SUPERSTART® (available from Alltech, now Lalemand), GERT STRAND® (available from Gert Strand AB, Sweden) and FERMOL® (available from DSM Specialties).

Distillation

After fermentation, the resulting fluids can be distilled using, for example, a "beer column" to separate ethanol and other alcohols from the majority of water and residual solids. The vapor exiting the beer column can be, e.g., 35% by weight ethanol and can be fed to a rectification column. A mixture of nearly azeotropic (92.5%) ethanol and water from the rectification column can be purified to pure (99.5%) ethanol using vapor-phase molecular sieves. The beer column bottoms can be sent to the first effect of a three-effect evaporator. The rectification column reflux condenser can provide heat for this first effect. After the first effect, solids can be separated using a centrifuge and dried in a rotary dryer. A portion (25%) of the centrifuge effluent can be recycled to fermentation and the rest sent to the second and third evaporator effects. Most of the evaporator condensate can be returned to the process as fairly clean condensate with a small portion split off to waste water treatment to prevent build-up of low-boiling compounds.

Hydrocarbon-Containing Materials

In other embodiments utilizing the methods and systems described herein, hydrocarbon-containing materials can be processed. Any process described herein can be used to treat any hydrocarbon-containing material herein described. "Hydrocarbon-containing materials," as used herein, is meant to include oil sands, oil shale, tar sands, coal dust, coal slurry, bitumen, various types of coal, and other naturally-occurring and synthetic materials that include both hydrocarbon components and solid matter. The solid matter can include wood, rock, sand, clay, stone, silt, drilling slurry, or other solid organic and/or inorganic matter. The term can also include waste products such as drilling waste and by-products, refining waste and by-products, or other waste products containing hydrocarbon components, such as asphalt shingling and covering, asphalt pavement, etc.

Wood and Wood-Containing Materials

In yet other embodiments utilizing the methods and systems described herein, wood and wood containing products can be processed. For example, lumber products can be processed, e.g. boards, sheets, laminates, beams, particle boards, composites, rough cut wood, soft wood and hard wood. In addition cut trees, bushes, wood chips, saw dust, roots, bark, stumps, decomposed wood and other wood containing biomass material can be processed.

Conveying Systems

Various conveying systems can be used to convey the biomass material, for example, as discussed, to a vault, and under an electron beam in a vault. Exemplary conveyors are belt conveyors, pneumatic conveyors, screw conveyors, carts, trains, trains or carts on rails, elevators, front loaders, backhoes, cranes, various scrapers and shovels, trucks, and throwing devices can be used. For example, vibratory conveyors can be used in various processes described herein. Vibratory conveyors are described in PCT/US2013/64289 filed Oct. 10, 2013 the full disclosure of which is incorporated by reference herein.

Vibratory conveyors are particularly useful for spreading the material when it is a sachet or pouch or prior to it being formed into a sealed web. Vibratory conveyors are also useful for spreading material and producing a uniform layer on the conveyor trough surface that is not in a sachet or pouch. For example, the initial feedstock can form a pile of material that can be at least four feet high (e.g., at least about 3 feet, at least about 2 feet, at least about 1 foot, at least about 6 inches, at least about 5 inches, at least about, 4 inches, at least about 3 inches, at least about 2 inches, at least about 1 inch, at least about ½ inch) and spans less than the width of the conveyor (e.g., less than about 10%, less than about 20%, less than about 30%, less than about 40%, less than about 50%, less than about 60%, less than about 70%, less than about 80%, less than about 90%, less than about 95%, less than about 99%). The vibratory conveyor can spread the material to span the entire width of the conveyor trough and have a uniform thickness, preferably as discussed above. In some cases, an additional spreading method can be useful. For example, a spreader such as a broadcast spreader, a drop spreader (e.g., a CHRISTY SPREADER™) or combinations thereof can be used to drop (e.g., place, pour, spill and/or sprinkle) the feedstock over a wide area. Optionally, the spreader can deliver the biomass as a wide shower or curtain onto the vibratory conveyor. Additionally, a second conveyor, upstream from the first conveyor (e.g., the first conveyor is used in the irradiation of the feedstock), can drop biomass onto the first conveyor, where the second conveyor can have a width transverse to the direction of conveying smaller than the first conveyor. In particular, when the second conveyor is a vibratory conveyor, the feedstock is spread by the action of the second and first conveyor. In some optional embodiments, the second conveyor ends in a bias cross cut discharge (e.g., a bias cut with a ratio of 4:1) so that the material can be dropped as a wide curtain (e.g., wider than the width of the second conveyor) onto the first conveyor. The initial drop area of the biomass by the spreader (e.g., broadcast spreader, drop spreader, conveyor, or cross cut vibratory conveyor) can span the entire width of the first vibratory conveyor, or it can span part of this width. Once dropped onto the conveyor, the material is spread even more uniformly by the vibrations of the conveyor so that, preferably, the entire width of the conveyor is covered with a uniform layer of biomass. In some embodiments combinations of spreaders can be used. Some methods of spreading a feed stock are described in U.S. Pat. No. 7,153,533, filed Jul. 23, 2002 and published Dec. 26, 2006, the entire disclosure of which is incorporated herein by reference.

Generally, it is preferred to convey the material as quickly as possible through an electron beam to maximize throughput. For example, the material can be conveyed at rates of at least 1 ft/min, e.g., at least 2 ft/min, at least 3 ft/min, at least 4 ft/min, at least 5 ft/min, at least 10 ft/min, at least 15 ft/min, at least 20 ft/min, at least 25 ft/min, at least 30 ft/min, at least 40 ft/min, at least 50 ft/min, at least 60 ft/min, at least 70 ft/min, at least 80 ft/min, at least 90 ft/min. The rate of conveying is related to the beam current and targeted irradiation dose, for example, for a ¼ inch thick biomass spread over a 5.5 foot wide conveyor and 100 mA, the conveyor can move at about 20 ft/min to provide a useful irradiation dosage (e.g. about 10 Mrad for a single pass), at 50 mA the conveyor can move at about 10 ft/min to provide approximately the same irradiation dosage.

The rate at which material can be conveyed depends on the shape and mass of the material being conveyed. Flowing materials e.g., particulate materials, are particularly amenable to conveying with vibratory conveyors. Conveying speeds can, for example be, at least 100 lb/hr (e.g., at least 500 lb/hr, at least 1000 lb/hr, at least 2000 lb/hr, at least 3000 lb/hr, at least 4000 lb/hr, at least 5000 lb/hr, at least 10,000 lb/hr, at least 15,000 lb/hr, or even at least 25,000 lb/hr). Some typical conveying speeds can be between about 1000 and 10,000 lb/hr, (e.g., between about 1000 lb/hr and 8000 lb/hr, between about 2000 and 7000 lb/hr, between about 2000 and 6000 lb/hr, between about 2000 and 5000 lb/hr, between about 2000 and 4500 lb/hr, between about 1500 and 5000 lb/hr, between about 3000 and 7000 lb/hr, between about 3000 and 6000 lb/hr, between about 4000 and 6000 lb/hr and between about 4000 and 5000 lb/hr). Typical conveying speeds depend on the density of the material. For example, for a biomass with a density of about 35 lb/ft3, and a conveying speed of about 5000 lb/hr, the material is conveyed at a rate of about 143 ft3/hr, if the material is ¼" thick and is in a trough 5.5 ft wide, the material is conveyed at a rate of about 1250 ft/hr (about 21 ft/min) Rates of conveying the material can therefore vary greatly. Preferably, for example, a ¼" thick layer of biomass, is conveyed at speeds of between about 5 and 100 ft/min (e.g. between about 5 and 100 ft/min, between about 6 and 100 ft/min, between about 7 and 100 ft/min, between about 8 and 100 ft/min, between about 9 and 100 ft/min, between about 10 and 100 ft/min, between about 11 and 100 ft/min, between about 12 and 100 ft/min, between about 13 and 100 ft/min, between about 14 and 100 ft/min, between about 15 and 100 ft/min, between about 20 and 100 ft/min, between about 30 and 100 ft/min, between about 40 and 100 ft/min, between about 2 and 60 ft/min, between about 3 and 60 ft/min, between about 5 and 60 ft/min, between about 6 and 60 ft/min, between about 7 and 60 ft/min, between about 8 and 60 ft/min, between about 9 and 60 ft/min, between about 10 and 60 ft/min, between about 15 and 60 ft/min, between about 20 and 60 ft/min, between about 30 and 60 ft/min, between about 40 and 60 ft/min, between about 2 and 50 ft/min, between about 3 and 50 ft/min, between about 5 and 50 ft/min, between about 6 and 50 ft/min, between about 7 and 50 ft/min, between about 8 and 50 ft/min, between about 9 and 50 ft/min, between about 10 and 50 ft/min, between about 15 and 50 ft/min, between about 20 and 50 ft/min, between about 30 and 50 ft/min, between about 40 and 50 ft/min). It is preferable that the material be conveyed at a constant rate, for example, to help maintain a constant irradiation of the material as it passes under the electron beam (e.g., shower, field).

The vibratory conveyors described can include screens used for sieving and sorting materials. Port openings on the side or bottom of the troughs can be used for sorting, selecting or removing specific materials, for example, by size or shape. Some conveyors have counterbalances to reduce the dynamic forces on the support structure. Some vibratory conveyors are configured as spiral elevators, are designed to curve around surfaces and/or are designed to drop material from one conveyor to another (e.g., in a step, cascade or as a series of steps or a stair). Along with conveying materials conveyors can be used, by themselves or coupled with other equipment or systems, for screening, separating, sorting, classifying, distributing, sizing, inspection, picking, metal removing, freezing, blending, mixing, orienting, heating, cooking, drying, dewatering, cleaning, washing, leaching, quenching, coating, de-dusting and/or feeding. The conveyors can also include covers (e.g., dust-tight covers), side discharge gates, bottom discharge gates, special liners (e.g., anti-stick, stainless steel, rubber, custom steal, and or grooved), divided troughs, quench pools, screens, perforated plates, detectors (e.g., metal detectors), high temperature designs, food grade designs, heaters, dryers and or coolers. In addition, the trough can be of various shapes, for example, flat bottomed, vee shaped bottom, flanged at the top, curved bottom, flat with ridges in any direction, tubular, half pipe, covered or any combinations of these. In particular, the conveyors can be coupled with an irradiation systems and/or equipment.

The conveyors (e.g., vibratory conveyor) can be made of corrosion resistant materials. The conveyors can utilize structural materials that include stainless steel (e.g., 304, 316 stainless steel, HASTELLOY® ALLOYS and INCONEL® Alloys). For example, HASTELLOY® Corrosion-Resistant alloys from Hynes (Kokomo, Ind., USA) such as HASTELLOY® B-3® ALLOY, HASTELLOY® HYBRID-BC1® ALLOY, HASTELLOY® C-4 ALLOY, HASTELLOY® C-22® ALLOY, HASTELLOY® C-22HS® ALLOY, HASTELLOY® C-276 ALLOY, HASTELLOY® C-2000® ALLOY, HASTELLOY® G-30® ALLOY, HASTELLOY® G-35® ALLOY, HASTELLOY® N ALLOY and HASTELLOY® ULTIMET® alloy.

The vibratory conveyors can include non-stick release coatings, for example, TUFFLON™ (Dupont, Del., USA). The vibratory conveyors can also include corrosion resistant coatings. For example, coatings that can be supplied from Metal Coatings Corp (Houston, Tex., USA) and others such as Fluoropolymer, XYLAN®, Molybdenum Disulfide, Epoxy Phenolic, Phosphate—ferrous metal coating, Polyurethane—high gloss topcoat for epoxy, inorganic zinc, Poly Tetrafluoro ethylene, PPS/RYTON®, fluorinated ethylene propylene, PVDF/DYKOR®, ECTFE/HALAR® and Ceramic Epoxy Coating. The coatings can improve resistance to process gases (e.g., ozone), chemical corrosion, pitting corrosion, galling corrosion and oxidation.

Optionally, in addition to the conveying systems described herein, one or more other conveying systems can be enclosed. When using an enclosure, the enclosed conveyor can also be purged with an inert gas so as to maintain an atmosphere at a reduced oxygen level. Keeping oxygen levels low avoids the formation of ozone which in some instances is undesirable due to its reactive and toxic nature. For example, the oxygen can be less than about 20% (e.g., less than about 10%, less than about 1%, less than about 0.1%, less than about 0.01%, or even less than about 0.001% oxygen). Purging can be done with an inert gas including, but not limited to, nitrogen, argon, helium or carbon dioxide. This can be supplied, for example, from a boil off of a liquid source (e.g., liquid nitrogen or helium), generated or separated from air in situ, or supplied from tanks. The inert gas can be recirculated and any residual oxygen can be removed using a catalyst, such as a copper catalyst bed. Alternatively, combinations of purging, recirculating and oxygen removal can be done to keep the oxygen levels low.

The enclosed conveyor can also be purged with a reactive gas that can react with the biomass. This can be done before, during or after the irradiation process. The reactive gas can be, but is not limited to, nitrous oxide, ammonia, oxygen, ozone, hydrocarbons, aromatic compounds, amides, peroxides, azides, halides, oxyhalides, phosphides, phosphines, arsines, sulfides, thiols, boranes and/or hydrides. The reactive gas can be activated in the enclosure, e.g., by irradiation (e.g., electron beam, UV irradiation, microwave irradiation, heating, IR radiation), so that it reacts with the biomass. The biomass itself can be activated, for example, by irradiation. Preferably the biomass is activated by the electron beam, to produce radicals which then react with the activated or unactivated reactive gas, e.g., by radical coupling or quenching.

Purging gases supplied to an enclosed conveyor can also be cooled, for example, below about 25° C., below about 0° C., below about −40° C., below about −80° C., below about −120° C. For example, the gas can be boiled off from a compressed gas such as liquid nitrogen or sublimed from solid carbon dioxide. As an alternative example, the gas can be cooled by a chiller or part of or the entire conveyor can be cooled.

Other Embodiments

Any material, processes or processed materials discussed herein can be used to make products and/or intermediates such as composites, fillers, binders, plastic additives, adsorbents and controlled release agents. The methods can include densification, for example, by applying pressure and heat to the materials. For example, composites can be made by combining fibrous materials with a resin or polymer. For example, radiation cross-linkable resin, e.g., a thermoplastic resin can be combined with a fibrous material to provide a fibrous material/cross-linkable resin combination. Such materials can be, for example, useful as building materials, protective sheets, containers and other structural materials (e.g., molded and/or extruded products). Absorbents can be, for example, in the form of pellets, chips, fibers and/or sheets. Adsorbents can be used, for example, as pet bedding, packaging material or in pollution control systems. Controlled release matrices can also be the form of, for example, pellets, chips, fibers and or sheets. The controlled release matrices can, for example, be used to release drugs, biocides, fragrances. For example, composites, absorbents and control release agents and their uses are described in International Serial No. PCT/US2006/010648, filed Mar. 23, 2006, and U.S. Pat. No. 8,074,910 filed Nov. 22, 2011, the entire disclosures of which are herein incorporated by reference.

In some instances the biomass material is treated at a first level to reduce recalcitrance, e.g., utilizing accelerated electrons, to selectively release one or more sugars (e.g., xylose). The biomass can then be treated to a second level to release one or more other sugars (e.g., glucose). Optionally the biomass can be dried between treatments. The treatments can include applying chemical and biochemical treatments to release the sugars. For example, a biomass material can be treated to a level of less than about 20 Mrad (e.g., less than about 15 Mrad, less than about 10 Mrad, less than about 5 Mrad, less than about 2 Mrad) and then treated with a solution of sulfuric acid, containing less than 10% sulfuric acid (e.g., less than about 9%, less than about 8%, less than about 7%, less than about 6%, less than about 5%, less than about 4%, less than about 3%, less than about 2%, less than about 1%, less than about 0.75%, less than about 0.50%, less than about 0.25%) to release xylose. Xylose, for example, that is released into solution, can be separated from solids and optionally the solids washed with a solvent/solution (e.g., with water and/or acidified water). Optionally, the Solids can be dried, for example, in air and/or under vacuum optionally with heating (e.g., below about 150 deg C., below about 120 deg C.) to a water content below about 25 wt % (below about 20 wt. %, below about 15 wt. %, below about 10 wt. %, below about 5 wt. %). The solids can then be treated with a level of less than about 30 Mrad (e.g., less than about 25 Mrad, less than about 20 Mrad, less than about 15 Mrad, less than about 10 Mrad, less than about 5 Mrad, less than about 1 Mrad or even not at all) and then treated with an enzyme (e.g., a cellulase) to release glucose. The glucose (e.g., glucose in solution) can be separated from the remaining solids. The solids can then be further processed, for example, utilized to make energy or other products (e.g., lignin derived products).

Flavors, Fragrances and Colorants

Any of the products and/or intermediates described herein, for example, produced by the processes, systems and/or equipment described herein, can be combined with flavors, fragrances, colorants and/or mixtures of these. For example, any one or more of (optionally along with flavors, fragrances and/or colorants) sugars, organic acids, fuels, polyols, such as sugar alcohols, biomass, fibers and composites can be combined with (e.g., formulated, mixed or reacted) or used to make other products. For example, one or more such product can be used to make soaps, detergents, candies, syrup, drinks (e.g., cola, wine, beer, liquors such as gin or vodka, sports drinks, coffees, teas), pharmaceuticals, adhesives, sheets (e.g., woven, none woven, filters, tissues) and/or composites (e.g., boards). For example, one or more such product can be combined with herbs, flowers, petals, spices, vitamins, potpourri, or candles. For example, the formulated, mixed or reacted combinations can have flavors/fragrances of grapefruit, orange, apple, raspberry, banana, lettuce, celery, cinnamon, chocolate, vanilla, peppermint, mint, onion, garlic, pepper, saffron, ginger, milk, wine, beer, tea, lean beef, fish, clams, olive oil, coconut fat, pork fat, butter fat, beef bouillon, legume, potatoes, marmalade, ham, coffee and cheeses.

Flavors, fragrances and colorants can be added in any amount, such as between about 0.001 wt. % to about 30 wt. %, e.g., between about 0.01 to about 20, between about 0.05 to about 10, or between about 0.1 wt. % to about 5 wt. %. These can be formulated, mixed and or reacted (e.g., with any one of more product or intermediate described herein) by any means and in any order or sequence (e.g., agitated, mixed, emulsified, gelled, infused, heated, sonicated, and/or suspended). Fillers, binders, emulsifier, antioxidants can also be utilized, for example, protein gels, starches and silica.

In one embodiment the flavors, fragrances and colorants can be added to the biomass immediately after the biomass is irradiated such that the reactive sites created by the irradiation may react with reactive compatible sites of the flavors, fragrances, and colorants.

The flavors, fragrances and colorants can be natural and/or synthetic materials. These materials can be one or more of a compound, a composition or mixtures of these (e.g., a formulated or natural composition of several compounds). Optionally the flavors, fragrances, antioxidants and colorants can be derived biologically, for example, from a fermentation process (e.g., fermentation of saccharified materials as described herein). Alternatively, or additionally these flavors, fragrances and colorants can be harvested from a whole organism (e.g., plant, fungus, animal, bacteria or yeast) or a part of an organism. The organism can be collected and or extracted to provide color, flavors, fragrances and/or antioxidant by any means including utilizing the methods, systems and equipment described herein, hot water extraction, supercritical fluid extraction, chemical extraction (e.g., solvent or reactive extraction including acids and bases), mechanical extraction (e.g., pressing, comminuting, filtering), utilizing an enzyme, utilizing a bacteria such as to break down a starting material, and combinations of these methods. The compounds can be derived by a chemical reaction, for example, the combination of a sugar (e.g., as produced as described herein) with an amino acid (Maillard reaction). The flavor, fragrance, antioxidant and/or colorant can be an intermediate and or product produced by the methods, equipment or systems described herein, for example, and ester and a lignin derived product.

Some examples of flavor, fragrances or colorants are polyphenols. Polyphenols are pigments responsible for the red, purple and blue colorants of many fruits, vegetables, cereal grains, and flowers. Polyphenols also can have antioxidant properties and often have a bitter taste. The antioxidant properties make these important preservatives. On class of polyphenols are the flavonoids, such as Anthocyanidines, flavanonols, flavan-3-ols, s, flavanones and flavanonols. Other phenolic compounds that can be used include phenolic acids and their esters, such as chlorogenic acid and polymeric tannins.

Among the colorants inorganic compounds, minerals or organic compounds can be used, for example, titanium dioxide, zinc oxide, aluminum oxide, cadmium yellow (e.g., CdS), cadmium orange (e.g., CdS with some Se), alizarin crimson (e.g., synthetic or non-synthetic rose madder), ultramarine (e.g., synthetic ultramarine, natural ultramarine, synthetic ultramarine violet), cobalt blue, cobalt yellow, cobalt green, viridian (e.g., hydrated chromium(III)oxide), chalcophylite, conichalcite, cornubite, cornwallite and liroconite. Black pigments such as carbon black and self-dispersed blacks may be used.

Some flavors and fragrances that can be utilized include ACALEA TBHQ, ACET C-6, ALLYL AMYL GLYCOLATE, ALPHA TERPINEOL, AMBRETTOLJDE, AMBRINOL 95, ANDRANE, APHERMATE, APPLELIDE, BACDANOL®, BERGAMAL, BETA IONONE EPOXIDE, BETA NAPHTHYL ISO-BUTYL ETHER, BICYCLONONALACTONE, BORNAFIX®, CANTHOXAL, CASHMERAN®, CASHMERAN® VELVET, CASSIFFIX®, CEDRAFIX, CEDRAMBER®, CEDRYL ACETATE, CELESTOLIDE, CINNAMALVA, CITRAL DIMETHYL ACETATE, CITROLATE™, CITRONELLOL 700, CITRONELLOL 950, CITRONELLOL COEUR, CITRONELLYL ACETATE, CITRONELLYL ACETATE PURE, CITRONELLYL FORMATE, CLARYCET, CLONAL, CONIFERAN, CONIFERAN PURE, CORTEX ALDEHYDE 50% PEOMOSA, CYCLABUTE, CYCLACET®, CYCLAPROP®, CYCLEMAX™, CYCLOHEXYL ETHYL ACETATE, DAMASCOL, DELTA DAMASCONE, DIHYDRO CYCLACET, DIHYDRO MYRCENOL, DIHYDRO TERPINEOL, DIHYDRO TERPINYL ACETATE, DIMETHYL CYCLORMOL, DIMETHYL OCTANOL PQ, DIMYRCETOL, DIOLA, DIPENTENE, DULCINYL® RECRYSTALLIZED, ETHYL-3-PHENYL GLYCIDATE, FLEURAMONE, FLEURANIL, FLORAL SUPER, FLORALOZONE, FLORIFFOL, FRAISTONE, FRUCTONE, GALAXOLIDE® 50, GALAXOLIDE® 50 BB, GALAXOLIDE® 50 IPM, GALAXOLIDE® UNDILUTED, GALBASCONE, GERALDEHYDE, GERANIOL 5020, GERANIOL 600 TYPE, GERANIOL 950, GERANIOL 980 (PURE), GERANIOL CFT COEUR, GERANIOL COEUR, GERANYL ACETATE COEUR, GERANYL ACETATE, PURE, GERANYL FORMATE, GRISALVA, GUAIYL ACETATE, HELIONAL™, HERBAC, HERBALIME™, HEXADECANOLIDE, HEXALON, HEXENYL SALICYLATE CIS 3-, HYACINTH BODY, HYACINTH BODY NO. 3, HYDRATROPIC ALDEHYDE.DMA, HYDROXYOL, INDOLAROME, INTRELEVEN ALDEHYDE, INTRELEVEN ALDEHYDE SPECIAL, IONONE ALPHA, IONONE BETA, ISO CYCLO CITRAL, ISO CYCLO GERANIOL, ISO E SUPER®, ISOBUTYL QUINOLINE, JASMAL, JESSEMAL®, KHARISMAL®, KHARISMAL® SUPER, KHUSINIL, KOAVONE®, KOHINOOL®, LIFFAROME™, LIMOXAL, LINDENOL™, LYRAL®, LYRAME SUPER, MANDARIN ALD 10% TRI ETH, CITR, MARITIMA, MCK CHINESE, MEIJIFF™, MELAFLEUR, MELOZONE, METHYL ANTHRANILATE, METHYL IONONE ALPHA EXTRA, METHYL IONONE GAMMA A, METHYL IONONE GAMMA COEUR, METHYL IONONE GAMMA PURE, METHYL LAVENDER KETONE, MONTAVERDI®, MUGUESIA, MUGUET ALDEHYDE 50, MUSK Z4, MYRAC ALDEHYDE, MYRCENYL ACETATE, NECTARATE™, NEROL 900, NERYL ACETATE, OCIMENE, OCTACETAL, ORANGE FLOWER ETHER, ORPVONE, ORRINIFF 25%, OXASPIRANE, OZOFLEUR, PAMPLEFLEUR®, PEOMOSA, PHENOXANOL®, PICONIA, PRECYCLEMONE B, PRENYL ACETATE, PRISMANTOL, *RESEDA* BODY, ROSALVA, ROSAMUSK, SANJINOL, SANTALIFF™, SYVERTAL, TERPINEOL, TERPINOLENE 20, TERPINOLENE 90 PQ, TERPINOLENE RECT., TERPINYL ACETATE, TERPINYL ACETATE JAX, TETRAHYDRO, MUGUOL®, TETRAHYDRO MYRCENOL, TETRAMERAN, TIMBERS ILK™, TOBACAROL, TRIMOFIX® O TT, TRIPLAL®, TRISAMBER®, VANORIS, VERDOX™, VERDOX™ HC, VERTENEX®, VERTENEX® HC, VERTOFIX® COEUR, VERTOLIFF, VERTOLIFF ISO, VIOLIFF, VIVALDIE, ZENOLIDE, ABS INDIA 75 PCT MIGLYOL, ABS MOROCCO 50 PCT DPG, ABS MOROCCO 50 PCT TEC, ABSOLUTE FRENCH, ABSOLUTE INDIA, ABSOLUTE MD 50 PCT BB, ABSOLUTE MOROCCO, CONCENTRATE PG, TINCTURE 20 PCT, AMBERGRIS, AMBRETTE ABSOLUTE, AMBRETTE SEED OIL, ARMOISE OIL 70 PCT THUYONE, BASIL ABSOLUTE GRAND VERT, BASIL GRAND VERT ABS MD, BASIL OIL GRAND VERT, BASIL OIL VERVEINA, BASIL OIL VIETNAM, BAY OIL TERPENELESS, BEESWAX ABS N G, BEESWAX ABSOLUTE, BENZOIN RESINOID SIAM, BENZOIN RESINOID SIAM 50 PCT DPG, BENZOIN RESINOID SIAM 50 PCT PG, BENZOIN RESINOID SIAM 70.5 PCT TEC, BLACKCURRANT BUD ABS 65 PCT PG, BLACKCURRANT BUD ABS MD 37 PCT TEC, BLACKCURRANT BUD ABS MIGLYOL, BLACKCURRANT BUD ABSOLUTE BURGUNDY, BOIS DE ROSE OIL, BRAN ABSOLUTE, BRAN RESINOID, BROOM ABSOLUTE ITALY, CARDAMOM GUATEMALA C02 EXTRACT, CARDAMOM OIL GUATEMALA, CARDAMOM OIL INDIA, CARROT HEART, CASSIE ABSOLUTE EGYPT, CASSIE ABSOLUTE MD 50 PCT IPM, CASTOREUM ABS 90 PCT TEC, CASTOREUM ABS C 50 PCT MIGLYOL, CASTOREUM ABSOLUTE, CASTOREUM RESINOID, CASTOREUM RESINOID 50 PCT DPG, CEDROL CEDRENE, *CEDRUS ATLANTICA* OIL REDIST, CHAMOMILE OIL ROMAN, CHAMOMILE OIL WILD, CHAMOMILE OIL WILD LOW LIMONENE, CINNAMON BARK OIL CEYLAN, CISTE ABSOLUTE, CISTE ABSOLUTE COLORLESS, CITRONELLA OIL ASIA IRON FREE, CIVET ABS 75 PCT PG, CPVET ABSOLUTE, CIVET TINCTURE 10 PCT, CLARY SAGE ABS FRENCH DECOL, CLARY SAGE ABSOLUTE FRENCH, CLARY SAGE C'LESS 50 PCT PG, CLARY SAGE OIL FRENCH, COPAIBA BALSAM, COPAIBA BALSAM OIL, CORIANDER SEED OIL, CYPRESS OIL, CYPRESS OIL ORGANIC, DAVANA OIL, GALBANOL, GALBANUM ABSOLUTE COLORLESS, GALBANUM OIL, GALBANUM RESINOID, GALBANUM RESINOID 50 PCT DPG, GALBANUM RESINOID HERCOLYN BHT, GALBANUM RESINOID TEC BHT, GENTIANE ABSOLUTE MD 20 PCT BB, GENTIANE CONCRETE, GERANIUM ABS EGYPT MD, GERANIUM ABSOLUTE EGYPT, GERANIUM OIL CHINA, GERANIUM OIL EGYPT, GINGER OIL 624, GINGER OIL RECTIFIED SOLUBLE, GUAIACWOOD HEART, HAY ABS MD 50 PCT BB, HAY ABSOLUTE, HAY ABSOLUTE MD 50 PCT TEC, HEALINGWOOD, HYSSOP OIL ORGANIC, IMMORTELLE ABS YUGO MD 50 PCT TEC, IMMORTELLE ABSOLUTE SPAIN, IMMORTELLE ABSOLUTE YUGO, JASMIN ABS INDIA MD, JASMIN ABSOLUTE EGYPT, JASMIN ABSOLUTE INDIA, ASMIN ABSOLUTE MOROCCO, JASMIN ABSOLUTE SAMBAC, JONQUILLE ABS MD 20 PCT BB, JONQUILLE ABSOLUTE France, JUNIPER BERRY OIL FLG, JUNIPER BERRY OIL RECTIFIED SOLUBLE, LABDANUM RESINOID 50 PCT TEC, LABDANUM RESINOID BB, LABDANUM RESINOID MD, LABDANUM RESINOID MD 50 PCT BB, LAVANDIN ABSOLUTE H, LAVANDIN ABSOLUTE MD, LAVANDIN OIL ABRIAL ORGANIC, LAVANDIN OIL GROSSO ORGANIC, LAVANDIN OIL SUPER, LAVENDER ABSOLUTE H, LAVENDER ABSOLUTE MD, LAVENDER OIL COUMARIN FREE, LAVENDER OIL COUMARIN FREE ORGANIC, LAVENDER OIL MAILLETTE ORGANIC, LAVENDER OIL MT, MACE ABSOLUTE BB, *MAGNOLIA* FLOWER OIL LOW METHYL EUGENOL, *MAGNOLIA* FLOWER OIL, *MAGNOLIA* FLOWER OIL MD, *MAGNOLIA* LEAF OIL, MANDARIN OIL MD, MANDARIN OIL MD BHT, MATE ABSOLUTE BB, MOSS TREE ABSOLUTE MD TEX IFRA 43, MOSS-OAK ABS MD TEC IFRA 43, MOSS-OAK ABSOLUTE IFRA 43, MOSS-TREE ABSOLUTE MD IPM IFRA 43, MYRRH RESINOID BB, MYRRH RESINOID MD, MYRRH RESINOID TEC, MYRTLE OIL IRON FREE, MYRTLE OIL TUNISIA RECTIFIED, NARCISSE ABS MD 20 PCT BB, NARCISSE ABSOLUTE FRENCH, NEROLI OIL TUNISIA, NUTMEG OIL TERPENELESS, OEILLET ABSOLUTE, OLIBANUM RESINOID, OLIBANUM RESINOID BB, OLIBANUM RESINOID DPG, OLIBANUM RESINOID EXTRA 50 PCT DPG, OLIBANUM RESINOID MD, OLIBANUM RESINOID MD 50 PCT DPG, OLIBANUM RESINOID TEC, OPOPONAX RESINOID TEC, ORANGE BIGARADE OIL MD BHT, ORANGE BIGARADE OIL MD SCFC, ORANGE FLOWER ABSOLUTE TUNISIA, ORANGE FLOWER WATER ABSOLUTE TUNISIA, ORANGE LEAF ABSOLUTE, ORANGE LEAF WATER ABSOLUTE TUNISIA, ORRIS ABSOLUTE ITALY, ORRIS CONCRETE 15 PCT IRONE, ORRIS CONCRETE 8 PCT IRONE, ORRIS NATURAL 15 PCT IRONE 4095C, ORRIS NATURAL 8 PCT IRONE 2942C, ORRIS RESINOID, OSMANTHUS ABSOLUTE, OSMANTHUS ABSOLUTE MD 50 PCT BB, PATCHOULI HEART N°3, PATCHOULI OIL INDONESIA, PATCHOULI OIL INDONESIA IRON FREE, PATCHOULI OIL INDONESIA MD, PATCHOULI OIL REDIST, PENNYROYAL HEART, PEPPERMINT ABSOLUTE MD, PETITGRAIN BIGARADE OIL TUNISIA, PETITGRAIN CITRONNIER OIL, PETITGRAIN OIL PARAGUAY TERPENELESS, PETITGRAIN OIL TERPENELESS STAB, PIMENTO BERRY OIL, PIMENTO LEAF OIL, RHODINOL EX GERANIUM CHINA, ROSE ABS BULGARIAN LOW METHYL EUGENOL, ROSE ABS MOROCCO LOW METHYL EUGENOL, ROSE ABS TURKISH LOW METHYL EUGENOL, ROSE ABSOLUTE, ROSE ABSOLUTE BULGARIAN, ROSE ABSOLUTE *DAMASCENA*, ROSE ABSOLUTE MD, ROSE ABSOLUTE MOROCCO, ROSE ABSOLUTE TURKISH, ROSE OIL BULGARIAN, ROSE OIL *DAMASCENA* LOW METHYL EUGENOL, ROSE OIL TURKISH, ROSEMARY OIL CAMPHOR ORGANIC, ROSEMARY OIL TUNISIA, SANDALWOOD OIL INDIA, SANDALWOOD OIL INDIA RECTIFIED, SANTALOL, *SCHINUS MOLLE* OIL, ST JOHN BREAD TINCTURE 10 PCT, *STYRAX* RESINOID, *STYRAX* RESINOID, TAGETE OIL, TEA TREE HEART, TONKA BEAN ABS 50 PCT SOLVENTS, TONKA BEAN ABSOLUTE, TUBEROSE ABSOLUTE INDIA, VETIVER HEART EXTRA, VETIVER OIL HAITI, VETIVER OIL HAITI MD, VETIVER OIL JAVA, VETIVER OIL JAVA MD, VIOLET LEAF ABSOLUTE EGYPT, VIOLET LEAF ABSOLUTE EGYPT DECOL, VIOLET LEAF ABSOLUTE FRENCH, VIOLET LEAF ABSOLUTE MD 50 PCT BB, WORMWOOD OIL TERPENELESS, YLANG EXTRA OIL, YLANG III OIL and combinations of these.

The colorants can be among those listed in the Color Index International by the Society of Dyers and Colourists. Colorants include dyes and pigments and include those commonly used for coloring textiles, paints, inks and inkjet inks. Some colorants that can be utilized include carotenoids, arylide yellows, diarylide yellows, β-naphthols, naphthols, benzimidazolones, disazo condensation pigments, pyrazolones, nickel azo yellow, phthalocyanines, quinacridones, perylenes and perinones, isoindolinone and isoindoline pigments, triarylcarbonium pigments, diketopyrrolopyrrole pigments, thioindigoids. Cartenoids include, for example, alpha-carotene, beta-carotene, gamma-carotene, lycopene, lutein and astaxanthin, Annatto extract, Dehydrated beets (beet powder), Canthaxanthin, Caramel, β-Apo-8'-carotenal, Cochineal extract, Carmine, Sodium copper chlorophyllin, Toasted partially defatted cooked cottonseed flour, Ferrous gluconate, Ferrous lactate, Grape color extract, Grape skin extract (enocianina), Carrot oil, Paprika, Paprika oleoresin, Mica-based pearlescent pigments, Riboflavin, Saffron, Titanium dioxide, Tomato lycopene extract; tomato lycopene concentrate, Turmeric, Turmeric oleoresin, FD&C Blue No. 1, FD&C Blue No. 2, FD&C Green No. 3, Orange B, Citrus Red No. 2, FD&C Red No. 3, FD&C Red No. 40, FD&C Yellow No. 5, FD&C Yellow No. 6, Alumina (dried aluminum hydroxide), Calcium carbonate, Potassium sodium copper chlorophyllin (chlorophyllin-copper complex), Dihydroxyacetone, Bismuth oxychloride, Ferric ammonium ferrocyanide, Ferric ferrocyanide, Chromium hydroxide green, Chromium oxide greens, Guanine, Pyrophyllite, Talc, Aluminum powder, Bronze powder, Copper powder, Zinc oxide, D&C Blue No. 4, D&C Green No. 5, D&C Green No. 6, D&C Green No. 8, D&C Orange No. 4, D&C Orange No. 5, D&C Orange No. 10, D&C Orange No. 11, FD&C Red No. 4, D&C Red No. 6, D&C Red No. 7, D&C Red No. 17, D&C Red No. 21, D&C Red No. 22, D&C Red No. 27, D&C Red No. 28, D&C Red No. 30, D&C Red No. 31, D&C Red No. 33, D&C Red No. 34, D&C Red No. 36, D&C Red No. 39, D&C Violet No. 2, D&C Yellow No. 7, Ext. D&C Yellow No. 7, D&C Yellow No. 8, D&C Yellow No. 10, D&C Yellow No. 11, D&C Black No. 2, D&C Black No. 3 (3), D&C Brown No. 1, Ext. D&C, Chromium-cobalt-aluminum oxide, Ferric ammonium citrate, Pyrogallol, Logwood extract, 1,4-Bis[(2-hydroxy-ethyl)amino]-9,10-anthracenedione bis(2-propenoic) ester copolymers, 1,4-Bis[(2-methylphenyl)amino]-9,10-anthracenedione, 1,4-Bis[4-(2-methacryloxyethyl) phenylamino]anthraquinone copolymers, Carbazole violet, Chlorophyllin-copper complex, Chromium-cobalt-aluminum oxide, C.I. Vat Orange 1, 2-[[2,5-Diethoxy-4-[(4-methylphenyl)thiol]phenyl]azo]-1,3,5-benzenetriol, 16,23-Dihydrodinaphtho[2,3-a:2',3'-i]naphth[2',3':6,7]indolo[2,3-c] carbazole-5,10,15,17,22,24-hexone, N,N'-(9,10-Dihydro-9, 10-dioxo-1,5-anthracenediyl)bisbenzamide, 7,16-Dichloro-6,15-dihydro-5,9,14,18-anthrazinetetrone, 16,17-Dimethoxydinaphtho (1,2,3-cd:3',2',1'-1m) perylene-5,10-dione, Poly(hydroxyethyl methacrylate)-dye copolymers(3), Reactive Black 5, Reactive Blue 21, Reactive Orange 78, Reactive Yellow 15, Reactive Blue No. 19, Reactive Blue No. 4, C.I. Reactive Red 11, C.I. Reactive Yellow 86, C.I. Reactive Blue 163, C.I. Reactive Red 180, 4-[(2,4-dimethylphenyl)azo]-2,4-dihydro-5-methyl-2-phenyl-3H-pyrazol-3-one (solvent Yellow 18), 6-Ethoxy-2-(6-ethoxy-3-oxobenzo[b]thien-2(3H)-ylidene)benzo[b]thiophen-3(2H)-one, Phthalocyanine green, Vinyl alcohol/methyl methacrylate-dye reaction products, C.I. Reactive Red 180, C.I. Reactive Black 5, C.I. Reactive Orange 78, C.I. Reactive Yellow 15, C.I. Reactive Blue 21, Disodium 1-amino-4-[[4-[(2-bromo-1-oxoallyl)amino]-2-sulphonatophenyl] amino]-9,10-dihydro-9,10-di oxoanthracene-2-sulphonate (Reactive Blue 69), D&C Blue No. 9, [Phthalocyaninato (2-)] copper and mixtures of these.

Other than in the examples herein, or unless otherwise expressly specified, all of the numerical ranges, amounts, values and percentages, such as those for amounts of materials, elemental contents, times and temperatures of reaction, ratios of amounts, and others, in the following portion of the specification and attached claims may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains error necessarily resulting from the standard deviation found in its underlying respective testing measurements. Furthermore, when numerical ranges are set forth herein, these ranges are inclusive of the recited range end points (e.g., end points may be used). When percentages by weight are used herein, the numerical values reported are relative to the total weight.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. The terms "one," "a," or "an" as used herein are intended to include "at least one" or "one or more," unless otherwise indicated.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The entire disclosures of the following applications are incorporated herein by reference: PCT/US13/064317, filed Oct. 10, 2013; PCT/US13/064320, filed Oct. 10, 2013; PCT/US 14/21584, filed Mar. 7, 2014; PCT/US 14/21634, filed Mar. 7, 2014; PCT/US 14/21604, filed Mar. 7, 2014; PCT/US 14/21609, filed Mar. 7, 2014; PCT/US 14/21616, filed Mar. 7, 2014; PCT/US 14/21629, filed Mar. 7, 2014; PCT/US 14/21630, filed Mar. 7, 2014; PCT/US 14/21632, filed Mar. 7, 2014; PCT/US 14/21638, filed Mar. 7, 2014; PCT/US 14/21815, filed Mar. 7, 2014; PCT/US14/21813, filed Mar. 7, 2014; PCT/US 14/21796, filed Mar. 7, 2014.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method comprising;
conveying a material through an area of ionizing radiation to irradiate the material, wherein conveying comprises enclosing the material in a conveying web comprising upper and lower flexible sheets that are sealed together, the conveying web being supplied from a source, passed through the area of ionizing radiation in a direction generally parallel to a longitudinal axis of the conveying web, and collected after irradiation of the material.

2. The method of claim 1, wherein the conveying web defines discrete spaced apart sachets or pouches along its longitudinal length, the sachets or pouches enclosing the material.

3. The method of claim 2, wherein the sachets are spaced apart along the longitudinal length by between about 0.5 cm and about 50 cm.

4. The method of claim 2, wherein the sachets are spaced apart along the longitudinal length between about 1 cm and about 25 cm.

5. The method of claim 2, wherein the sachets are spaced apart along the longitudinal length between about 2 cm and about 10 cm.

6. The method of claim 2, wherein the discrete sachets further are spaced apart along a lateral dimension of the web, which is substantially perpendicular to its longitudinal length.

7. The method of claim 6, wherein the sachets are spaced apart along a lateral dimension of from about 0.5 cm and about 50 cm.

8. The method of claim 7, wherein the sachets are spaced apart along a lateral dimension of from about 1 cm and about 25 cm.

9. The method of claim 7, wherein the sachets are spaced apart along a lateral dimension of from about 2 cm and about 10 cm.

10. The method of claim 1, wherein the upper sheet and the lower sheet each have a thickness of from about 1 mil and about 10 mil.

11. The method of claim 10, wherein the sheets have a thickness of from about 2 mil and about 6 mil.

12. The method of 1, wherein the upper sheet and the lower sheet each include apertures defined therein.

13. The method of claim 12, wherein each aperture has a diameter of from about 0.01 mil and about 5 mil.

14. The method of claim 12, wherein each aperture has a diameter of from about 0.1 mil and about 3 mil.

15. The method of claim 12, wherein each aperture has a diameter of from about 0.5 mil and about 2 mil.

16. The method of claim 1, wherein the web comprises a synthetic material.

17. The method of claim 16, wherein the web is formed from a thermoplastic material.

18. The method of claim 17, wherein the thermoplastic material includes a polyolefin configured to crosslink upon irradiation.

19. The method of claim 18, wherein the thermoplastic material includes a polyolefin configured to not degrade upon irradiation.

20. The method of claim 17, wherein the thermoplastic material includes a polyolefin comprising polyethylene.

21. The method of claim 20, wherein the polyethylene is selected from the group consisting of polyethylene homopolymer, linear low density polyethylene, low density polyethylene and high density polyethylene.

22. The method claim 1, wherein the ionizing radiation is contained in a vault.

23. The method of claim 22, wherein the vault comprises a lead/steel composite.

24. The method of claim 1, wherein the material is conveyed on a substantially flat surface in a direction substantially perpendicular to the beam of ionizing radiation.

25. The method of claim 1, wherein the enclosed material is a lignocellulosic or cellulosic material.

26. The method of claim 1, wherein the enclosed material receives a dose of radiation between about 10 and 150 Mrad of radiation.

27. The method of claim 1, wherein the ionizing radiation is an electron beam radiation.

28. The method of claim 27, wherein the average energy of the electrons in the electron beam are between about 0.5 MeV and about 2 MeV.

29. The method of claim 1, wherein the web enclosed material forms a substantially uniform layer of the enclosed material.

30. The method of claim 29, wherein the layer thickness is less than about 1" thick.

31. The method of claim 1, wherein the material has an average particle size between about 5 and about 0.1 mm.

32. The method of claim 1, further comprising releasing the material from the enclosing web and saccharifying the material.

33. The method of claim 1, wherein the conveying web supports the material as it passes through the area of ionizing radiation.

34. The method of claim 1, further comprising removing the material from the conveying web after irradiating the material and prior to collecting the conveying web.

35. The method of claim 34 wherein removing comprises cutting open the conveying web after irradiation to release the material from between the upper sheet and lower sheet.

36. The method of claim 34, wherein the conveying web comprises apertures and removing comprises utilizing a vacuum to draw the material through the apertures after irradiating the material.

37. The method of claim 34, wherein the conveying web comprises apertures and removing comprises stretching the web to enlarge the apertures.

38. The method of claim 1, wherein the material is a particulate material, and the sheets are sealed together in a manner so as to contain dust from the particulate material.

39. The method of claim 38, wherein the average particle size of the particulate material is at least about 0.25 mm and below about 6 mm.

\* \* \* \* \*